(12) United States Patent
Lajoie et al.

(10) Patent No.: US 9,511,805 B2
(45) Date of Patent: Dec. 6, 2016

(54) ENDLESS TRACK FOR PROPELLING A VEHICLE, WITH EDGE-CUTTING RESISTANCE

(75) Inventors: Hugues Lajoie, Sherbrooke (CA); Cheol Hee Han, Yusung-Gu (KR); Sung Chan Park, Dong-gu (KR)

(73) Assignee: Camso Inc., Magog (CA)

( * ) Notice: Subject to any disclaimer, the term of this patent is extended or adjusted under 35 U.S.C. 154(b) by 963 days.

(21) Appl. No.: 13/515,175

(22) PCT Filed: Apr. 22, 2010

(86) PCT No.: PCT/CA2010/000632
§ 371 (c)(1),
(2), (4) Date: Feb. 7, 2013

(87) PCT Pub. No.: WO2011/069233
PCT Pub. Date: Jun. 16, 2011

(65) Prior Publication Data
US 2013/0162016 A1    Jun. 27, 2013

(30) Foreign Application Priority Data
Dec. 11, 2009  (KR) .................. 10-2009-0123208

(51) Int. Cl.
*B62D 55/24* (2006.01)
(52) U.S. Cl.
CPC .................... *B62D 55/244* (2013.01)
(58) Field of Classification Search
CPC ...... B62D 55/24; B62D 55/244; B62D 55/253
(Continued)

(56) References Cited

U.S. PATENT DOCUMENTS

| 2,040,696 A | 5/1936 | Johnston |
|---|---|---|
| 2,369,130 A | 2/1945 | Benson |

(Continued)

FOREIGN PATENT DOCUMENTS

| CA | 2606039 | 4/2009 |
|---|---|---|
| CA | 2838935 | 1/2013 |

(Continued)

OTHER PUBLICATIONS

Adeeb Zarifa, "International Search Report", International Appl. No. PCT/CA2010/000632, mailed on Jul. 21, 2010 (3pages).

(Continued)

*Primary Examiner* — Kip T Kotter
(74) *Attorney, Agent, or Firm* — Fish & Richardson P.C.

(57) ABSTRACT

An endless track for providing traction to a vehicle, such as a construction vehicle, an agricultural vehicle or other work vehicle. The endless track has: an inner side for facing a plurality of wheels of the vehicle; a ground-engaging outer side for engaging the ground; a first lateral edge; and a second lateral edge. The endless track comprises an elastomeric body and a plurality of cores at least partially embedded in the elastomeric body. Each core extends transversally to a longitudinal direction of the endless track to provide transverse rigidity to the endless track. The endless track comprises an impact absorber in a lateral edge part of the endless track, the lateral edge part being located between the cores and a given one of the first lateral edge and the second lateral edge. The impact absorber facilitates an elastic deformation of the lateral edge part when the lateral edge part impacts an obstacle on the ground. For example, in some embodiments, the impact absorber may comprise one or more holes which can deform when the lateral edge part impacts an obstacle on the ground.

51 Claims, 20 Drawing Sheets

(58) Field of Classification Search
USPC ............... 305/165, 167, 170, 171, 172, 173, 174,305/175, 176, 177
See application file for complete search history.

(56) References Cited

U.S. PATENT DOCUMENTS

| | | | |
|---|---|---|---|
| 2,461,150 A | 2/1949 | Flynn et al. |
| 2,562,264 A | 7/1951 | Ford |
| 2,596,919 A | 5/1952 | Smith |
| 2,845,308 A | 7/1958 | Woltemar et al. |
| 2,854,294 A | 9/1958 | Bannister |
| 3,019,061 A | 1/1962 | Schomers |
| 3,118,709 A | 1/1964 | Case |
| 3,464,476 A | 9/1969 | Scheuba et al. |
| 3,582,154 A | 6/1971 | Russ, Sr. |
| 3,612,626 A | 10/1971 | Fuchs |
| 3,747,995 A | 7/1973 | Russ, Sr. |
| 3,747,996 A | 7/1973 | Huber |
| 3,767,275 A | 10/1973 | Russ, Sr. |
| 3,781,067 A | 12/1973 | Dodson et al. |
| 3,858,948 A | 1/1975 | Johnson et al. |
| 3,887,244 A | 6/1975 | Haslett et al. |
| 3,944,006 A | 3/1976 | Lassanske |
| 4,059,313 A | 11/1977 | Beyers et al. |
| RE29,718 E | 8/1978 | Reinsma et al. |
| 4,150,858 A | 4/1979 | Fox et al. |
| 4,218,101 A | 8/1980 | Thompson |
| 4,279,449 A | 7/1981 | Martin et al. |
| 4,538,860 A | 9/1985 | Edwards et al. |
| 4,583,791 A | 4/1986 | Nagata et al. |
| 4,586,757 A | 5/1986 | Bloechlinger |
| 4,587,280 A | 5/1986 | Guha et al. |
| 4,607,892 A | 8/1986 | Payne et al. |
| 4,696,520 A | 9/1987 | Henke et al. |
| 4,721,498 A | 1/1988 | Grob |
| D298,018 S | 10/1988 | Cartwright |
| 4,843,114 A | 6/1989 | Touchet et al. |
| 4,844,561 A | 7/1989 | Savage et al. |
| 4,880,283 A | 11/1989 | Savage et al. |
| 4,953,921 A | 9/1990 | Burns |
| 4,981,188 A | 1/1991 | Kadela |
| 5,018,591 A | 5/1991 | Price |
| 5,050,710 A | 9/1991 | Bargfrede |
| 5,088,045 A | 2/1992 | Shimanaka et al. |
| 5,145,242 A | 9/1992 | Togashi |
| 5,190,363 A | 3/1993 | Brittain et al. |
| 5,299,860 A | 4/1994 | Anderson |
| 5,320,585 A | 6/1994 | Kato |
| 5,352,029 A | 10/1994 | Nagorcka |
| 5,362,142 A | 11/1994 | Katoh |
| 5,368,115 A | 11/1994 | Crabb |
| 5,368,376 A | 11/1994 | Edwards et al. |
| 5,380,076 A | 1/1995 | Hori |
| 5,447,365 A | 9/1995 | Muramatsu et al. |
| 5,474,146 A | 12/1995 | Yoshioka et al. |
| 5,498,188 A | 3/1996 | Deahr |
| 5,513,683 A | 5/1996 | Causa et al. |
| 5,540,489 A | 7/1996 | Muramatsu et al. |
| 5,632,537 A | 5/1997 | Yoshimura et al. |
| 5,707,123 A | 1/1998 | Grob |
| 5,722,745 A | 3/1998 | Courtemanche et al. |
| 5,813,733 A | 9/1998 | Hori et al. |
| 5,866,265 A | 2/1999 | Reilly et al. |
| 5,894,900 A | 4/1999 | Yamamoto et al. |
| 5,904,217 A | 5/1999 | Yamamoto et al. |
| 5,984,438 A | 11/1999 | Tsunoda et al. |
| 5,997,109 A | 12/1999 | Kautsch |
| 6,030,057 A | 2/2000 | Fikse |
| 6,056,656 A | 5/2000 | Kitano et al. |
| 6,065,818 A | 5/2000 | Fischer |
| 6,068,354 A | 5/2000 | Akiyama et al. |
| 6,074,025 A | 6/2000 | Juncker et al. |
| 6,079,802 A | 6/2000 | Nishimura et al. |
| 6,095,275 A | 8/2000 | Shaw |
| 6,120,405 A | 9/2000 | Oertley et al. |
| 6,129,426 A | 10/2000 | Tucker |
| 6,139,121 A | 10/2000 | Muramatsu |
| 6,153,686 A | 11/2000 | Granatowicz et al. |
| 6,170,925 B1 | 1/2001 | Ono |
| 6,176,557 B1 | 1/2001 | Ono |
| 6,186,604 B1 | 2/2001 | Fikse |
| 6,193,335 B1 | 2/2001 | Edwards |
| 6,196,646 B1 | 3/2001 | Edwards |
| 6,206,492 B1 | 3/2001 | Moser |
| 6,229,264 B1 | 5/2001 | Ni et al. |
| 6,241,327 B1 | 6/2001 | Gleasman et al. |
| 6,296,329 B1 | 10/2001 | Rodgers et al. |
| 6,299,264 B1 | 10/2001 | Kautsch et al. |
| 6,300,396 B1 | 10/2001 | Tsunoda et al. |
| 6,352,320 B1 | 3/2002 | Bonko et al. |
| 6,386,652 B1 | 5/2002 | Bonko |
| 6,386,654 B1 | 5/2002 | Singer et al. |
| 6,401,847 B1 | 6/2002 | Lykken |
| 6,406,106 B1 | 6/2002 | Moss |
| 6,406,655 B1 | 6/2002 | Courtemanche |
| 6,416,142 B1 | 7/2002 | Oertley |
| 6,474,756 B2 | 11/2002 | Hori et al. |
| 6,494,548 B2 | 12/2002 | Courtemanche |
| 6,533,371 B2 * | 3/2003 | Hori et al. ............... 305/191 |
| 6,536,852 B2 | 3/2003 | Katayama et al. |
| 6,568,769 B1 | 5/2003 | Watanabe et al. |
| D476,599 S | 7/2003 | Whittington |
| 6,588,862 B1 | 7/2003 | Pringiers |
| 6,652,043 B2 | 11/2003 | Oertley |
| D488,171 S | 4/2004 | Juncker et al. |
| 6,716,012 B2 | 4/2004 | Yovichin et al. |
| 6,733,091 B2 | 5/2004 | Deland et al. |
| 6,769,746 B2 | 8/2004 | Rodgers et al. |
| 6,800,236 B1 | 10/2004 | Kurata et al. |
| 6,874,586 B2 | 4/2005 | Boivin et al. |
| D505,136 S | 5/2005 | Brazier |
| 6,913,329 B1 | 7/2005 | Rodgers et al. |
| 6,923,515 B2 | 8/2005 | Konickson et al. |
| 6,932,442 B2 | 8/2005 | Hori |
| 6,935,708 B2 | 8/2005 | Courtemanche |
| 6,962,222 B2 | 11/2005 | Kirihata |
| 6,964,462 B2 | 11/2005 | Katoh et al. |
| 6,974,196 B2 | 12/2005 | Gagne et al. |
| 7,001,294 B2 | 2/2006 | Fukuda |
| 7,032,636 B2 | 4/2006 | Salakari |
| 7,077,216 B2 | 7/2006 | Juncker |
| D528,133 S | 9/2006 | Brazier |
| 7,114,788 B2 | 10/2006 | Deland et al. |
| 7,131,508 B2 | 11/2006 | Brazier |
| 7,137,675 B1 | 11/2006 | Simula et al. |
| 7,222,924 B2 | 5/2007 | Christianson |
| 7,229,141 B2 | 6/2007 | Dandurand et al. |
| 7,252,348 B2 | 8/2007 | Gingras |
| 7,293,844 B2 | 11/2007 | Uchiyama |
| D556,791 S | 12/2007 | Brazier |
| 7,325,888 B2 | 2/2008 | Fujita et al. |
| 7,367,637 B2 | 5/2008 | Gleasman |
| 7,407,236 B2 | 8/2008 | Fukushima |
| 7,413,268 B2 | 8/2008 | Kato et al. |
| 7,497,530 B2 | 3/2009 | Bessette |
| 7,597,161 B2 | 10/2009 | Brazier |
| 7,625,050 B2 | 12/2009 | Bair |
| 7,708,092 B2 | 5/2010 | Després |
| 7,779,947 B2 | 8/2010 | Stratton |
| 7,784,884 B2 | 8/2010 | Soucy et al. |
| 7,798,260 B2 | 9/2010 | Albright et al. |
| 7,823,987 B2 | 11/2010 | Dandurand et al. |
| 7,914,088 B2 | 3/2011 | Bair |
| 7,914,089 B2 | 3/2011 | Bair |
| D644,670 S | 9/2011 | Barrelmeyer |
| 8,016,368 B2 * | 9/2011 | Sugihara ............... 305/166 |
| 8,122,581 B1 | 2/2012 | Hurst et al. |
| 8,342,257 B2 | 1/2013 | Rosenboom |
| D680,561 S | 4/2013 | Zuchoski et al. |
| D681,071 S | 4/2013 | Zuchoski et al. |
| D683,371 S | 5/2013 | Aubé |
| D683,769 S | 6/2013 | Aubé |
| 2002/0070607 A1 | 6/2002 | Edwards |
| 2002/0140288 A1 | 10/2002 | Herberger, Sr. et al. |

(56) References Cited

U.S. PATENT DOCUMENTS

| | | |
|---|---|---|
| 2002/0145335 A1 | 10/2002 | Soucy et al. |
| 2003/0019133 A1 | 1/2003 | Hori |
| 2003/0034189 A1 | 2/2003 | Lemke et al. |
| 2003/0034690 A1 | 2/2003 | Hori et al. |
| 2003/0080618 A1 | 5/2003 | Krishnan et al. |
| 2004/0004395 A1 | 1/2004 | Soucy et al. |
| 2004/0070273 A1 | 4/2004 | Safe et al. |
| 2004/0084962 A1 | 5/2004 | Courtemanche |
| 2004/0130212 A1 | 7/2004 | Ishibashi |
| 2004/0135433 A1 | 7/2004 | Inaoka et al. |
| 2005/0035654 A1 | 2/2005 | Tamaru et al. |
| 2005/0056468 A1 | 3/2005 | Tucker |
| 2005/0103540 A1 | 5/2005 | Lavoie |
| 2005/0104449 A1 | 5/2005 | Lavoie et al. |
| 2005/0104450 A1 | 5/2005 | Gagne et al. |
| 2005/0168069 A1 | 8/2005 | Ueno |
| 2006/0060395 A1 | 3/2006 | Boivin et al. |
| 2006/0061212 A1* | 3/2006 | Uchiyama ............... 305/167 |
| 2006/0103236 A1 | 5/2006 | Soucy et al. |
| 2006/0124366 A1 | 6/2006 | Le Masne De Chermont |
| 2006/0175108 A1 | 8/2006 | Kubota |
| 2006/0220456 A1 | 10/2006 | Sugahara |
| 2006/0248484 A1 | 11/2006 | Baumgartner et al. |
| 2006/0273660 A1 | 12/2006 | Dandurand et al. |
| 2007/0046100 A1 | 3/2007 | McGilvrey et al. |
| 2007/0075456 A1 | 4/2007 | Feldmann |
| 2007/0126286 A1 | 6/2007 | Feldmann et al. |
| 2007/0159004 A1 | 7/2007 | St-Amant |
| 2007/0252433 A1 | 11/2007 | Fujita |
| 2008/0007118 A1 | 1/2008 | Fujita |
| 2008/0073971 A1 | 3/2008 | Paradis et al. |
| 2008/0100134 A1 | 5/2008 | Soucy et al. |
| 2008/0136255 A1 | 6/2008 | Feldmann et al. |
| 2008/0169147 A1 | 7/2008 | Brazier |
| 2008/0203813 A1 | 8/2008 | Doyle |
| 2008/0211300 A1 | 9/2008 | Matsuo et al. |
| 2008/0211301 A1 | 9/2008 | Jee et al. |
| 2009/0085398 A1 | 4/2009 | Maltais |
| 2009/0102283 A1 | 4/2009 | Choi |
| 2009/0166101 A1 | 7/2009 | Wenger et al. |
| 2009/0302677 A1 | 12/2009 | Sugihara |
| 2009/0309415 A1 | 12/2009 | Shimozono |
| 2010/0012399 A1 | 1/2010 | Hansen |
| 2010/0033010 A1 | 2/2010 | Shimozono |
| 2010/0095506 A1 | 4/2010 | Bair |
| 2010/0096915 A1 | 4/2010 | Hagio |
| 2010/0230185 A1 | 9/2010 | Mallette et al. |
| 2010/0253138 A1 | 10/2010 | Desperés |
| 2010/0283317 A1 | 11/2010 | Soucy et al. |
| 2011/0068620 A1 | 3/2011 | Delisle et al. |
| 2011/0121644 A1 | 5/2011 | Wellman |
| 2011/0148189 A1 | 6/2011 | Courtemanche et al. |
| 2011/0301825 A1 | 12/2011 | Grajkowski et al. |
| 2011/0315459 A1 | 12/2011 | Zuchoski et al. |
| 2012/0001478 A1 | 1/2012 | Zuchoski et al. |
| 2012/0056473 A1 | 3/2012 | Hashimoto et al. |
| 2012/0104840 A1 | 5/2012 | Zuchoski et al. |
| 2012/0242142 A1 | 9/2012 | Kautsch et al. |
| 2012/0242143 A1 | 9/2012 | Feldmann |
| 2013/0126196 A1 | 5/2013 | Rosenboom |
| 2013/0134772 A1 | 5/2013 | Dandurand et al. |
| 2013/0134773 A1 | 5/2013 | Dandurand et al. |
| 2013/0162016 A1 | 6/2013 | Lajoie et al. |
| 2014/0182960 A1 | 7/2014 | Bedard et al. |

FOREIGN PATENT DOCUMENTS

| | | |
|---|---|---|
| EP | 1 008 509 | 6/2000 |
| EP | 1 211 169 | 6/2002 |
| EP | 1 283 152 | 2/2003 |
| EP | 1 506 913 | 2/2005 |
| EP | 1 953 070 | 8/2008 |
| EP | 2 014 542 | 1/2009 |
| EP | 2 119 620 | 11/2009 |
| JP | 06-32262 | 2/1994 |
| JP | 06-48334 | 2/1994 |
| JP | 2000-053037 | 2/2000 |
| JP | 2000233775 A * | 8/2000 |
| JP | 2003-089366 | 3/2003 |
| JP | 2004-330830 | 11/2004 |
| JP | 2006-103482 | 4/2006 |
| JP | 2007-022304 | 2/2007 |
| JP | 4-194599 | 12/2008 |
| JP | 2009-061829 | 3/2009 |
| JP | 2009-248924 | 10/2009 |
| JP | 2010-018091 | 1/2010 |
| JP | 2010-047040 | 3/2010 |
| JP | 2010-089729 | 4/2010 |
| KR | 10-2007-0089354 | 8/2007 |
| WO | WO 2008/108439 | 9/2008 |
| WO | WO 2009/105892 | 9/2009 |
| WO | WO 2009/106617 | 9/2009 |
| WO | WO 2013/002781 | 1/2013 |

OTHER PUBLICATIONS

Adeeb Zarifa, "Written Opinion of the International Searching Authority", International Appl. No. PCT/CA2010/000632, mailed on Jul. 21, 2010 (4pages).
Bridgestone Industrial Products America, Inc., "Stay on the Right Track. Rubber Tracks for Track Loaders", Brochure 2009 (6 pages).
Bridgestone Industrial Products America, Inc., "Stay on the Right Track. New Generation Features Rubber Tracks for Excavators", Brochure 2009 (12 pages).
Extended European Search Report and Written Opinion; Sep. 13, 2013; EP 10835318.6; 8 pp.
U.S. Appl. No. 61/808,148, filed Apr. 3, 2013, De Boe et al.
U.S. Appl. No. 13/112,840, filed May 20, 2011, Delisle et al.
U.S. Appl. No. 13/325,783, filed Dec. 14, 2011, Lussier et al.
U.S. Appl. No. 13/325,796, filed Dec. 14, 2011, Lussier et al.
U.S. Appl. No. 13/326,010, filed Dec. 14, 2011, Lussier et al.
U.S. Appl. No. 13/326,110, filed Dec. 14, 2011, Zuchoski et al.
U.S. Appl. No. 13/326,132, filed Dec. 14, 2011, Lussier et al.
U.S. Appl. No. 13/326,278, filed Dec. 14, 2011, Lussier et al.
U.S. Appl. No. 13/495,823, filed Jun. 13, 2012, Kautsch.
U.S. Appl. No. 13/649,312, filed Oct. 11, 2012, Zuchoski et al.
Non-Final Office Action issued by the U.S. Patent and Trademark Office on Jul. 10, 2014 in connection with U.S. Appl. No. 13/326,110; 16 pp.
Non-Final Office Action issued by the U.S. Patent and Trademark Office on Jun. 9, 2014 in connection with U.S. Appl. No. 13/326,132, 15 pp.
Non-Final Office Action issued by the U.S. Patent and Trademark Office on Jul. 14, 2014 in connection with U.S. Appl. No. 13/112,840.
Non-Final Office Action issued by the U U.S. Patent and Trademark Office on Sep. 29, 2014 in connection with U.S. Appl. No. 13/325,783; 27 pp.
Non-Final Office Action issued by the U.S. Patent and Trademark Office on Sep. 22, 2014 in connection with U.S. Appl. No. 13/325,796; 25 pp.
Non-Final Office Action issued by the U.S. Patent and Trademark Office on Jul. 10, 2014 in connection with U.S. Appl. No. 13/424,459; 14 p.
Non-Final Office Action issued by the U.S. Patent and Trademark Office on Nov. 9, 2012 in connection with U.S. Appl. No. 29/405,414, 8 p.
Non-Final Office Action issued by the U.S. Patent and Trademark Office on Nov. 9, 2012 in connection with U.S. Appl. No. 29/405,416, 8 p.
Non-Final Office Action issued by the U.S. Patent and Trademark Office on Nov. 9, 2012 in connection with U.S. Appl. No. 29/405,417, 9 p.
International Search Report and Written Opinion; PCT/CA2013/000864; Jan. 31, 2014; 8 pp.
Bair Products, Inc., "Larry Lugs—Patented Bolt-On Replacement Drive Lugs", http://www.bairproductsinc.com/products/larry_lugs.html, Jan. 1, 2011, 2 pp.

(56) References Cited

OTHER PUBLICATIONS

Red Roo Solutions PTY LTD—World Class Solutions for the Earth Moving Industry, "Save thousands of dollars and add thousands of hours to your tracks with Larry Lugs", http://www.redroosolutions.com.au/larrylugs.html, Jun. 8, 2009, 3 pp.
Camoplast Inc., "ATV/UTV Track Systems", 2009-2010 Catalog (8 pages).
CAN-AM BRP, "Parts & Accessories—Track System", Parts, Accessories & Riding Gear catalogue, p. 66 (2011).
Story by Staff, BRP upgrades Apache ATV track system for Outlander—Apache system features larger footprint and power steering mode, ATV.COM, http://www.atv.com/news/brp-upgrades-apache-atv-track-system-for-outlander-1481.html 2 pp. (Nov. 24, 2009).

\* cited by examiner

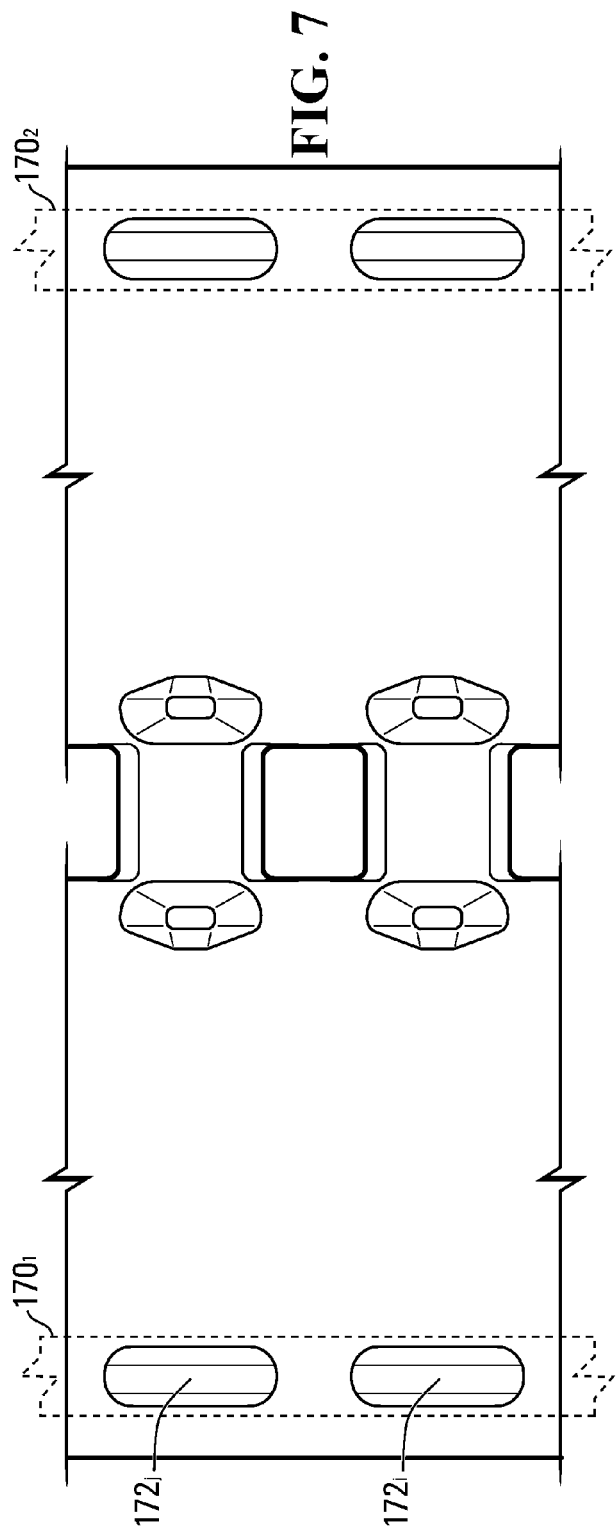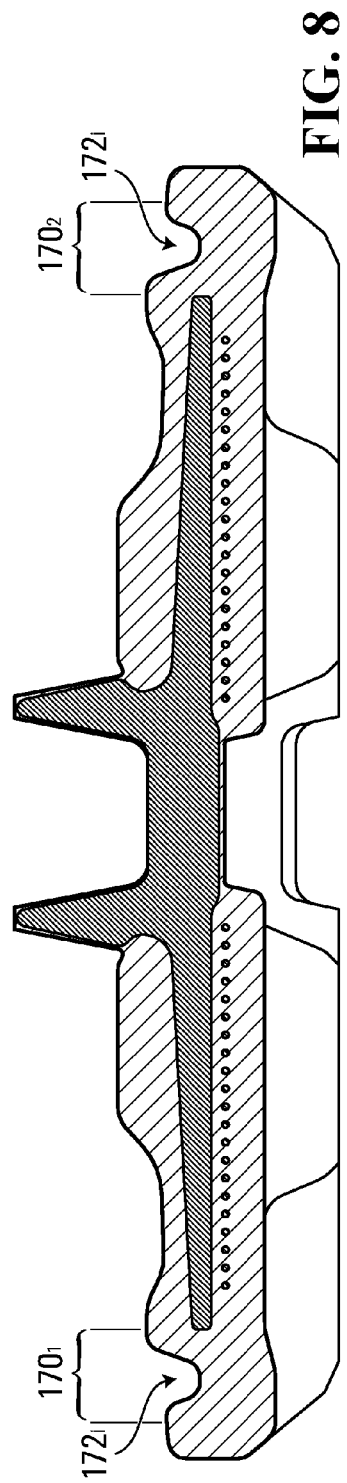

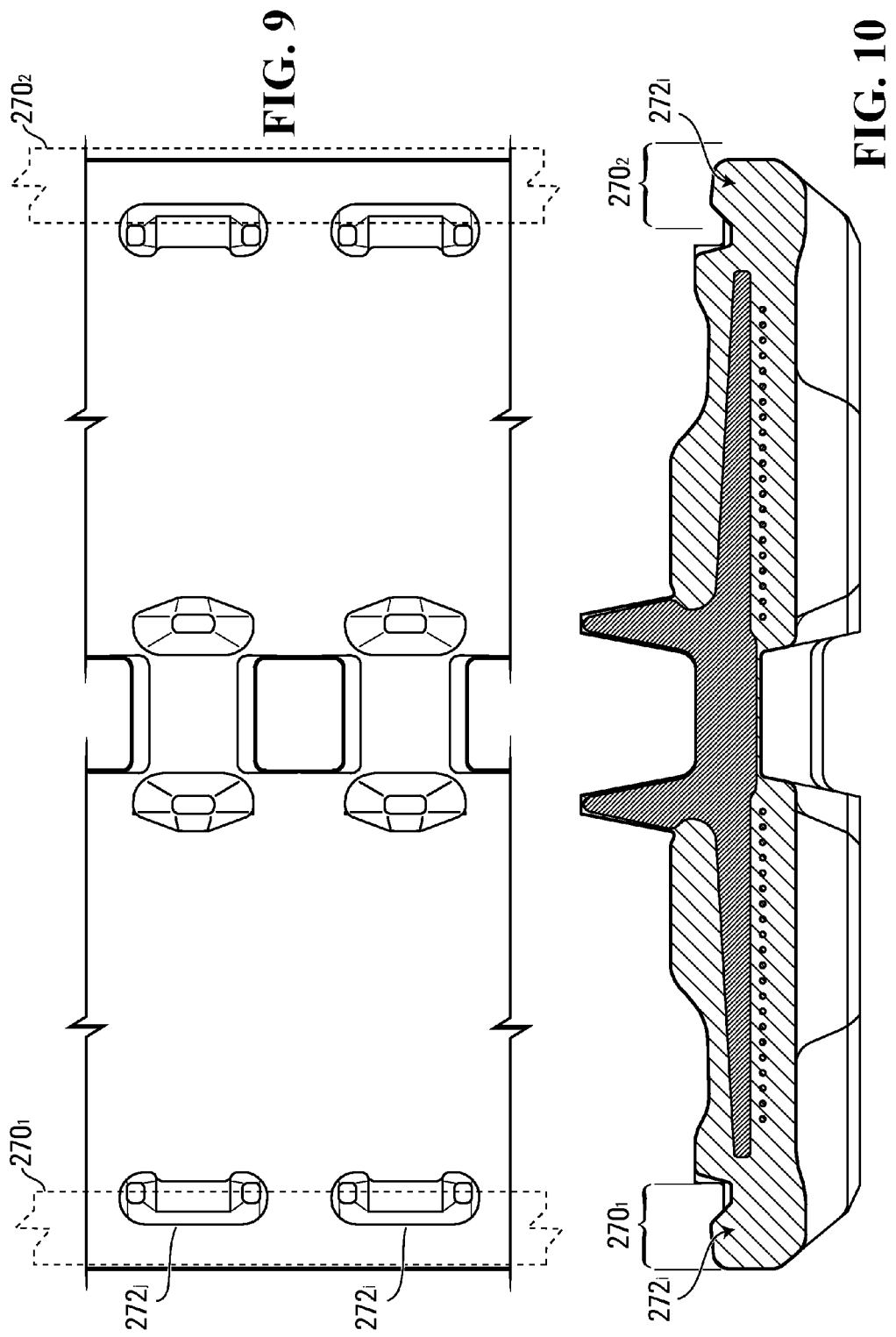

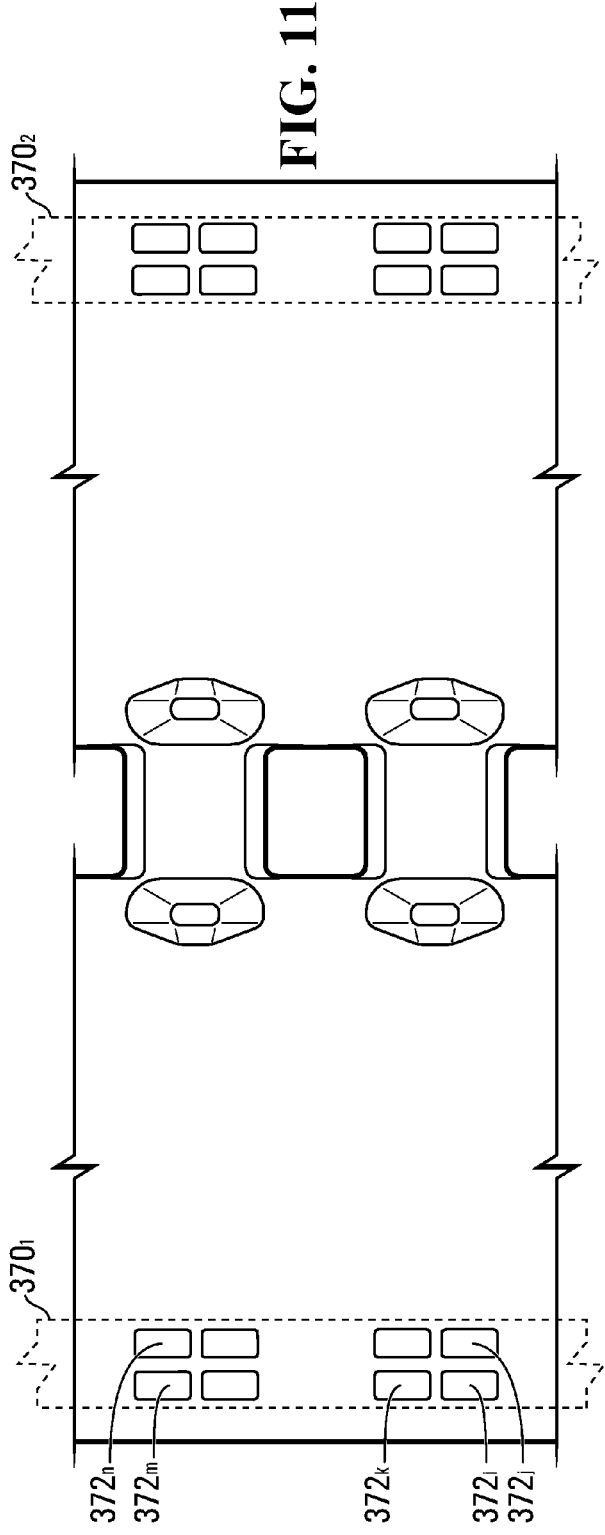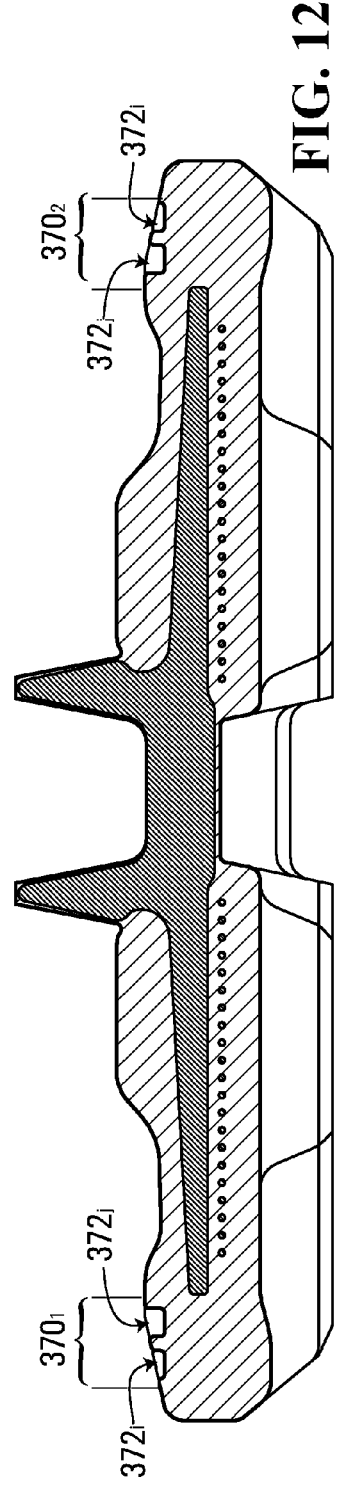

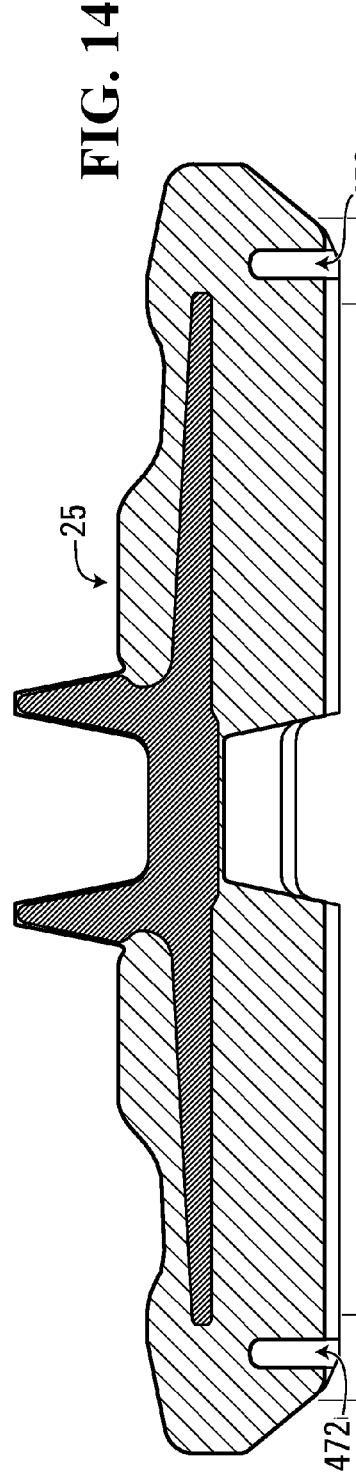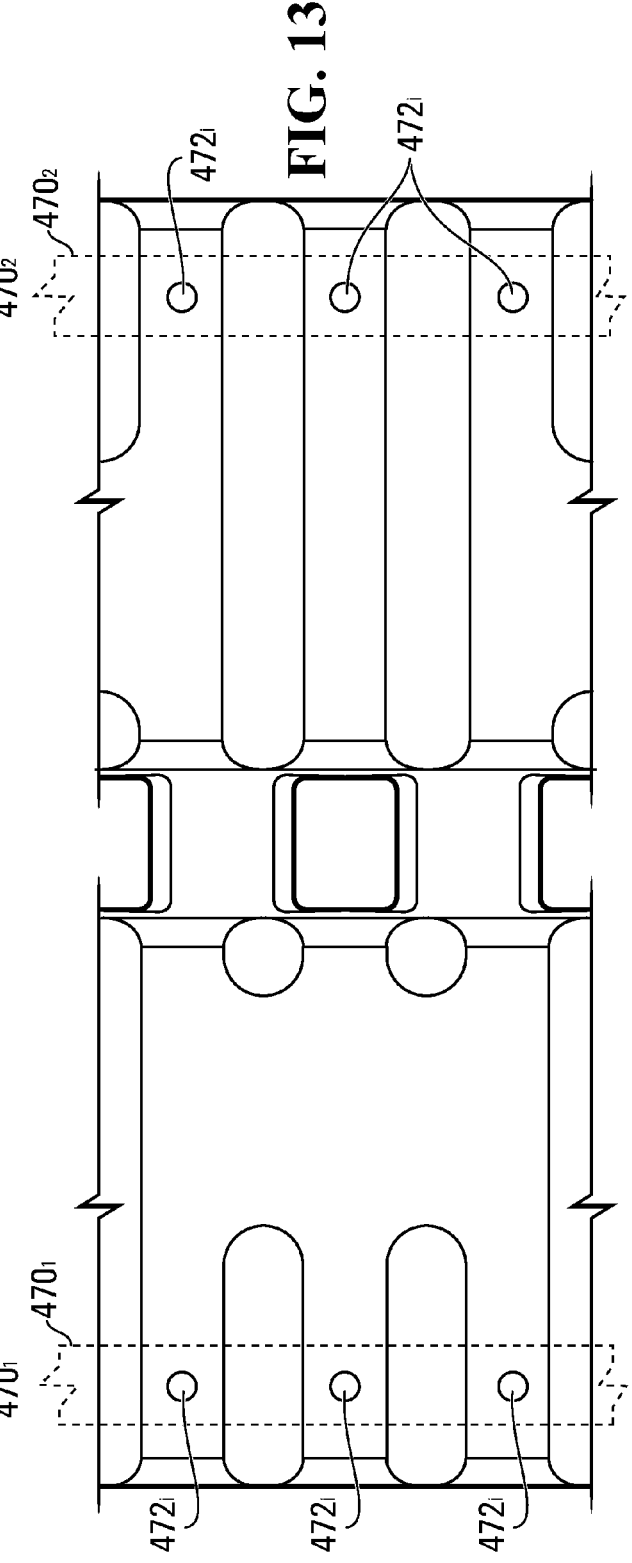

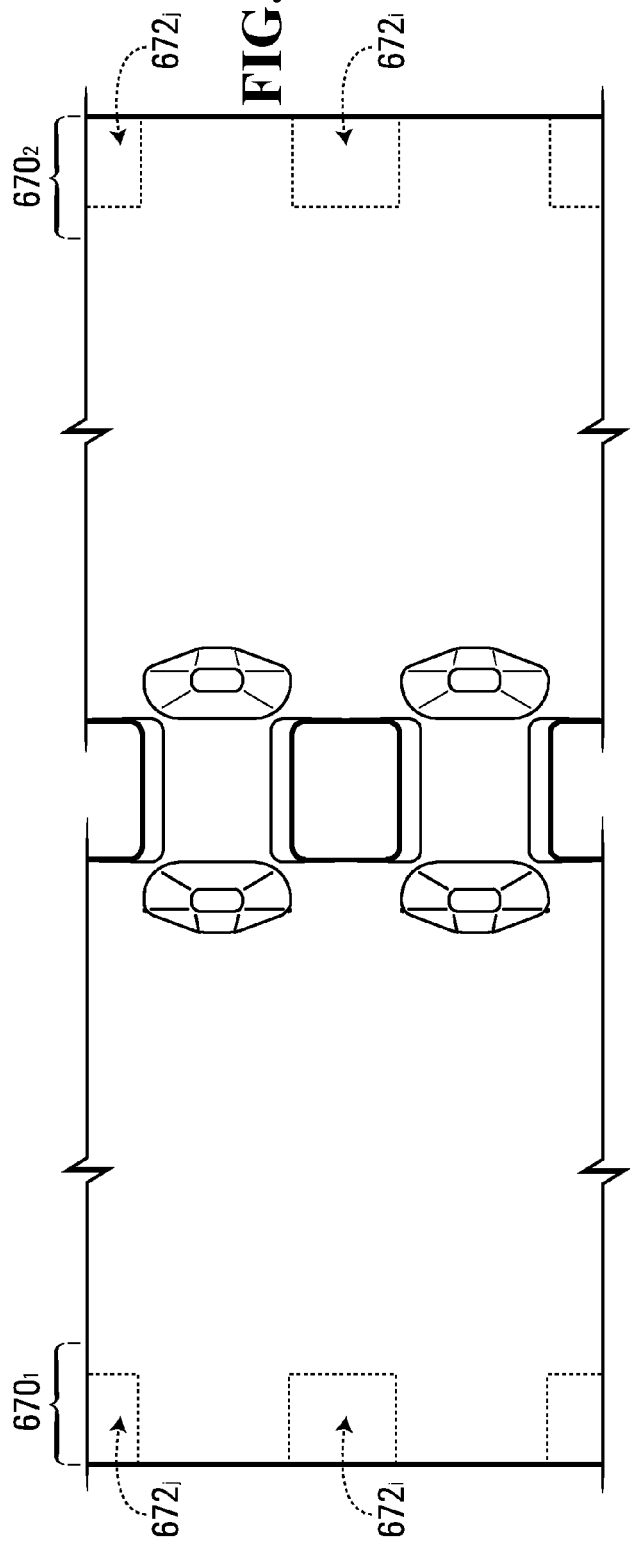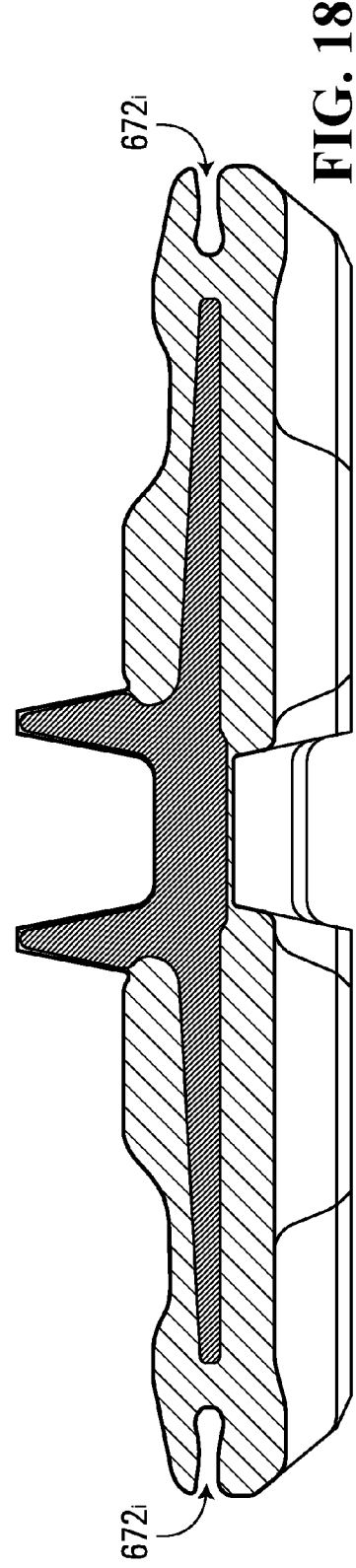

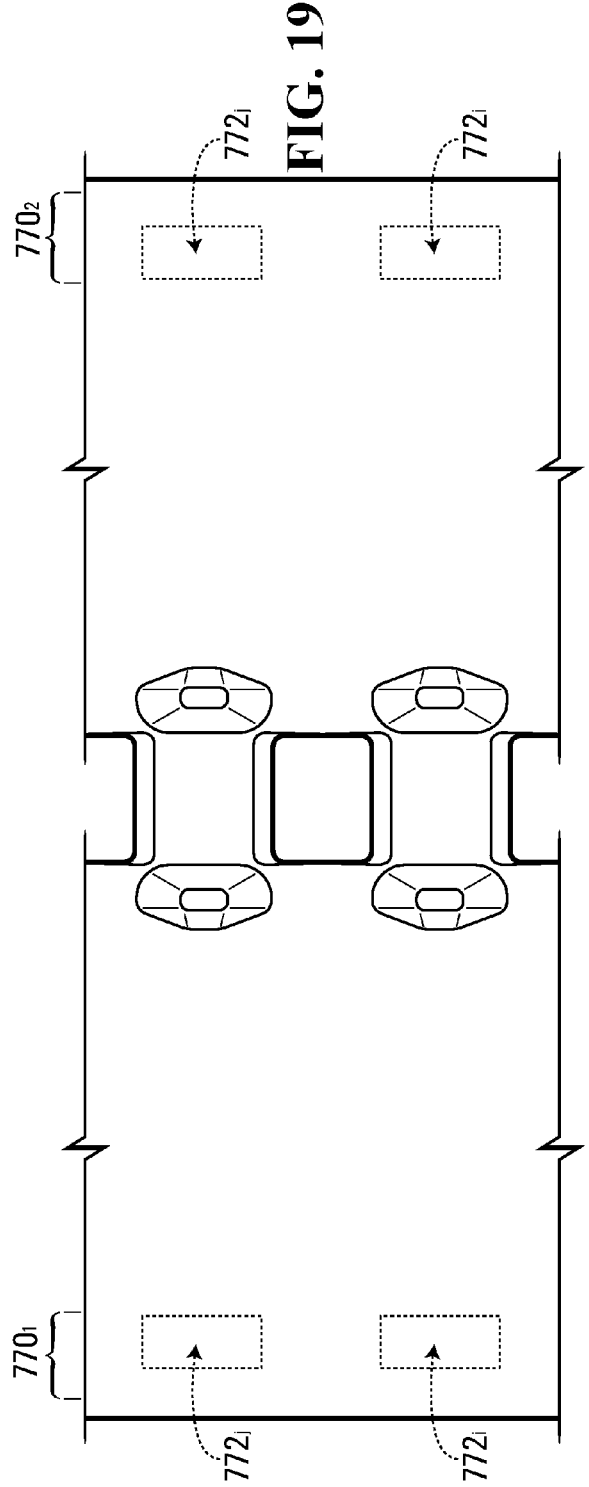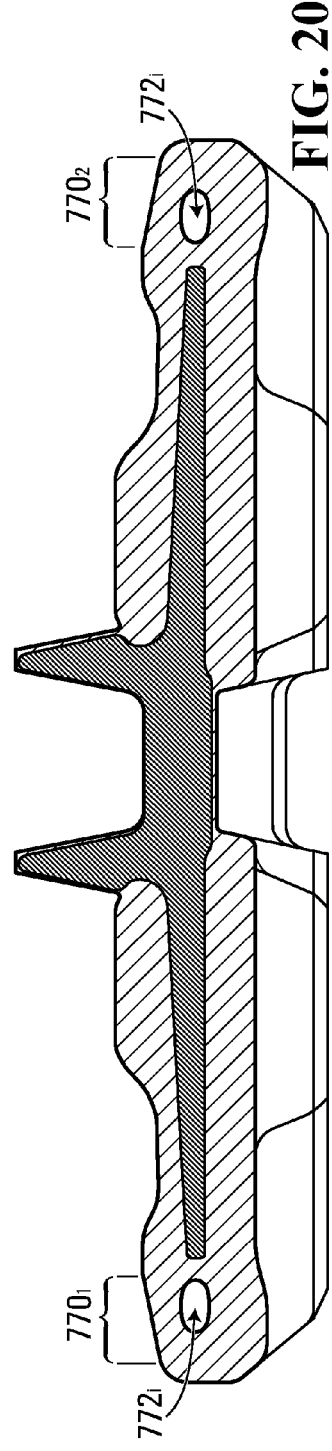

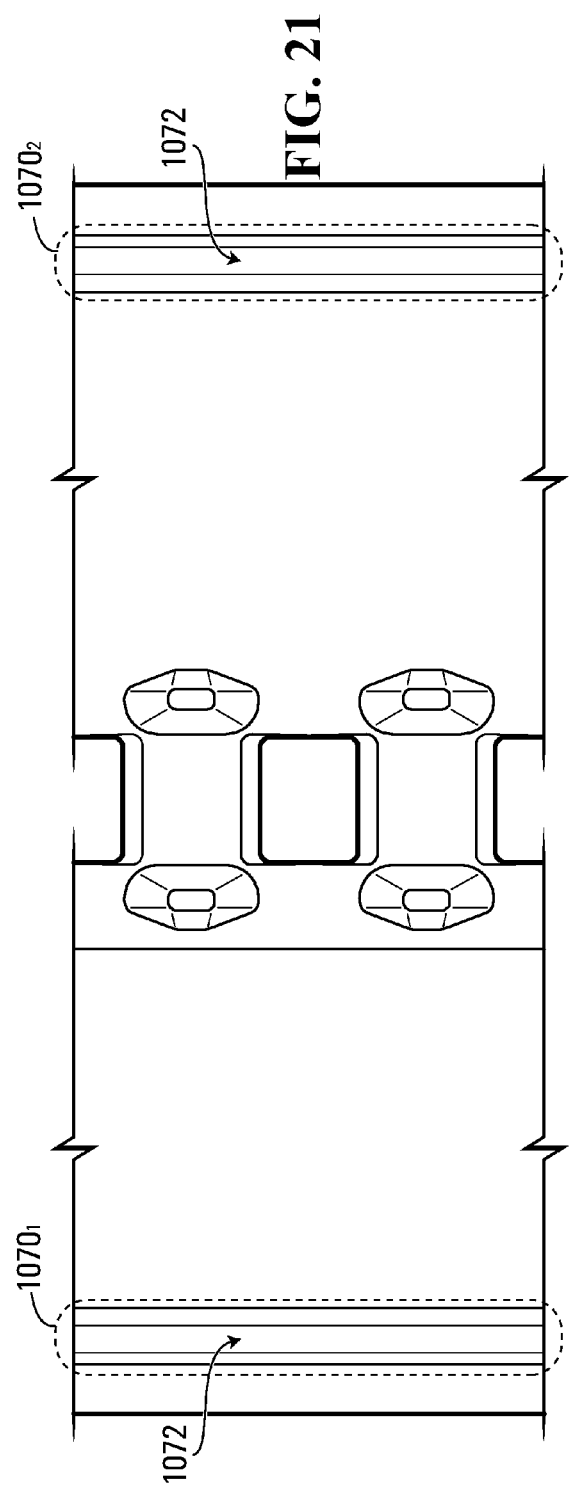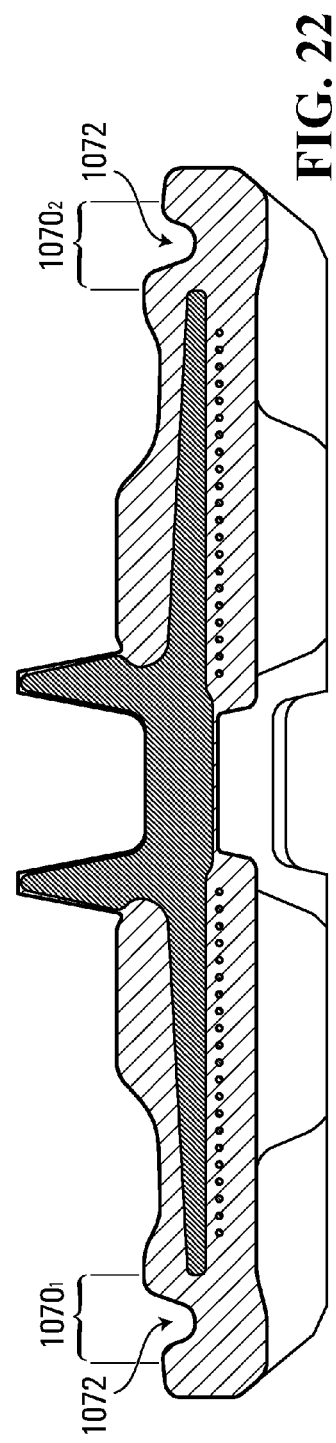

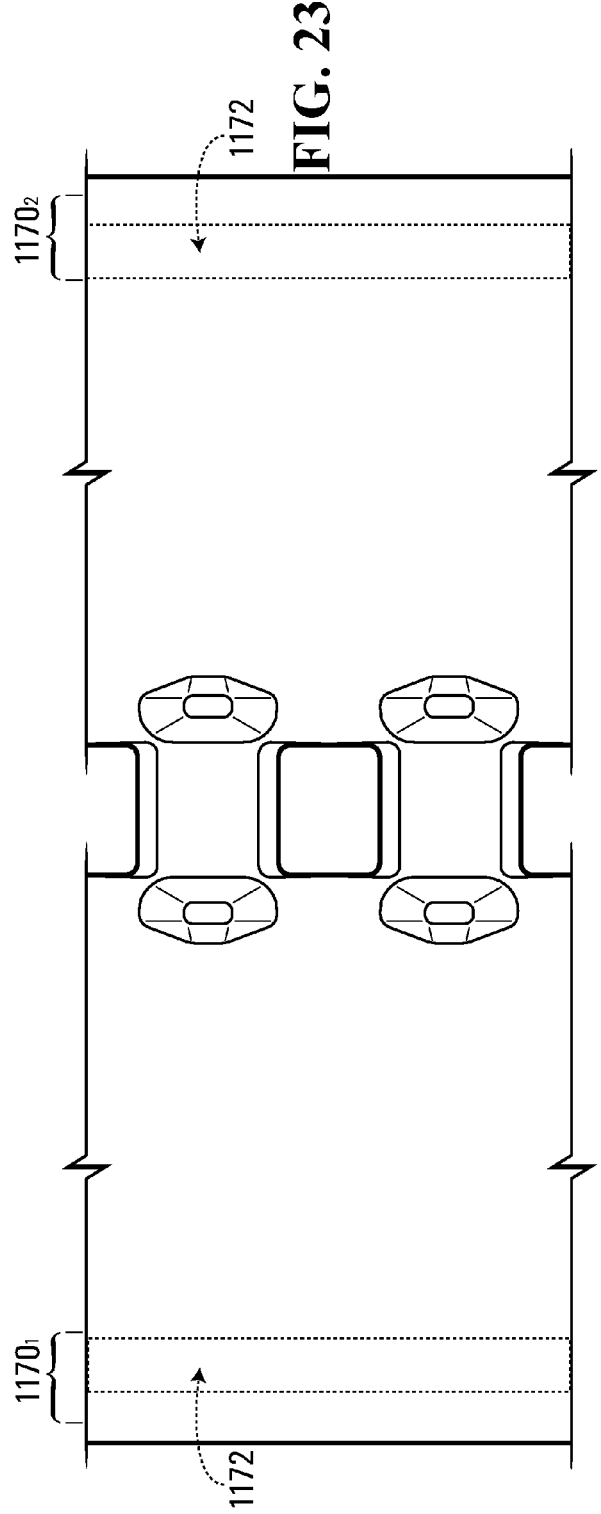
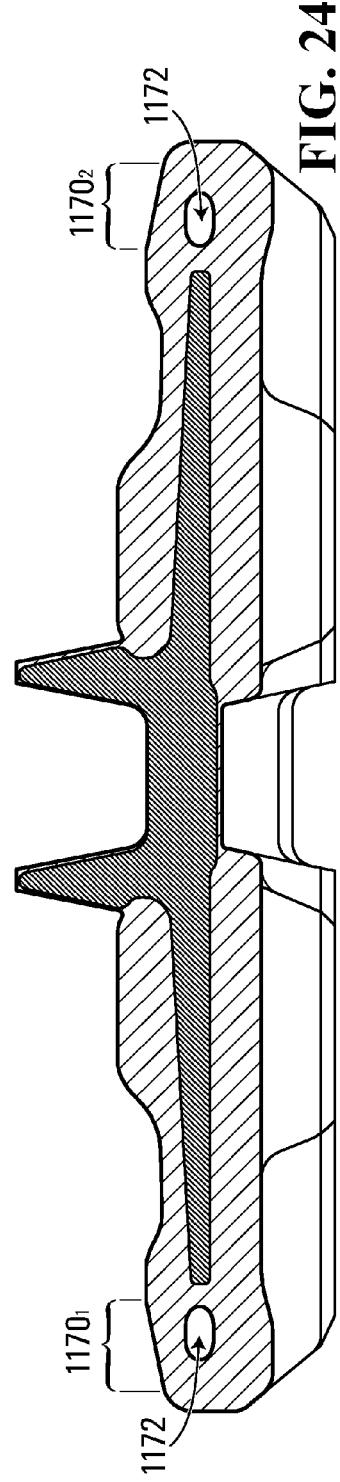

ENDLESS TRACK FOR PROPELLING A VEHICLE, WITH EDGE-CUTTING RESISTANCE

FIELD OF THE INVENTION

The invention relates to endless tracks for propelling vehicles operable off-road, such as tracked work vehicles (e.g., construction vehicles, agricultural vehicles, forestry vehicles, etc.).

BACKGROUND

Certain off-road vehicles, including work vehicles such as construction vehicles (e.g., loaders, bulldozers, excavators, etc.), agricultural vehicles (e.g., harvesters, combines, tractors, etc.) forestry vehicles (e.g., feller-bunchers, tree chippers, knuckleboom loaders, etc.) and military vehicles (e.g., combat engineering vehicles (CEVs), etc.), are often equipped with endless tracks that enhance their traction and floatation on soft, low friction and/or uneven grounds (e.g., soil, mud, sand, ice, snow, etc.) on which they operate.

One type of endless track comprises a body including elastomeric material (e.g., rubber) in which are embedded rigid cores (e.g., metallic cores) that extend transversally to impart transverse rigidity to the track and that guide or otherwise interact with wheels of the vehicle which face the track's inner side.

A problem often encountered with this type of endless track is that, when a lateral edge part of the track impacts an obstacle on the ground (e.g., a curb, a sidewalk, a rock, an abrupt change in ground level, etc.), the track may deform in such a way that some of its elastomeric material in its lateral edge part begins to tear. Such tearing of the track's elastomeric material, which is referred to as "edge-cutting", may cause premature deterioration of the track. For example, sand, rocks, water and/or other undesirable matter may infiltrate the track through the tear and prematurely deteriorate the track (e.g., by leading to a progressive loss of adhesion between the elastomeric material and the cores and/or other components of the track). In addition, the tear itself may reach a size that renders the track's performance and/or appearance unacceptable.

For these and other reasons, there is a need to improve wear resistance of endless tracks having embedded cores, particularly resistance to edge-cutting.

SUMMARY OF THE INVENTION

In accordance with a broad aspect, the invention provides an endless track for providing traction to a vehicle. The endless track has: an inner side for facing a plurality of wheels of the vehicle; a ground-engaging outer side for engaging the ground; a first lateral edge; and a second lateral edge. The endless track comprises an elastomeric body and a plurality of cores at least partially embedded in the elastomeric body. Each core extends transversally to a longitudinal direction of the endless track to provide transverse rigidity to the endless track. The endless track comprises an impact absorber in a lateral edge part of the endless track, the lateral edge part being located between the cores and a given one of the first lateral edge and the second lateral edge. The impact absorber facilitates an elastic deformation of the lateral edge part when the lateral edge part impacts an obstacle on the ground.

In accordance with another broad aspect, the invention provides an endless track for providing traction to a vehicle. The endless track has: an inner side for facing a plurality of wheels of the vehicle; a ground-engaging outer side for engaging the ground; a first lateral edge; and a second lateral edge. The endless track comprises an elastomeric body and a plurality of cores at least partially embedded in the elastomeric body. Each core extends transversally to a longitudinal direction of the endless track to provide transverse rigidity to the endless track. The endless track comprises a hole in a lateral edge part of the endless track, the lateral edge part being located between the cores and a given one of the first lateral edge and the second lateral edge. The hole is deformable when the lateral edge part impacts an obstacle on the ground.

In accordance with yet another broad aspect, the invention provides an endless track for providing traction to a vehicle. The endless track has: an inner side for facing a plurality of wheels of the vehicle; a ground-engaging outer side for engaging the ground; a first lateral edge; and a second lateral edge. The endless track comprises an elastomeric body and a plurality of cores at least partially embedded in the elastomeric body. Each core extends transversally to a longitudinal direction of the endless track to provide transverse rigidity to the endless track. The endless track comprises a plurality of holes in a first lateral edge part of the endless track, the first lateral edge part being located between the first lateral edge and the cores. The holes of the first lateral edge part extend inwardly from a periphery of the endless track and are distributed along the longitudinal direction of the endless track. The endless track comprises a plurality of holes in a second lateral edge part of the endless track, the second lateral edge part being located between the second lateral edge and the cores. The holes of the second lateral edge part extend inwardly from the periphery of the endless track and are distributed along the longitudinal direction of the endless track.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 7 and 8 respectively show a top view and a cross-sectional view of an endless track in accordance with another embodiment of the invention;

FIGS. 9 and 10 respectively show a top view and a cross-sectional view of an endless track in accordance with yet another embodiment of the invention;

FIGS. 11 and 12 respectively show a top view and a cross-sectional view of an endless track in accordance with yet another embodiment of the invention;

FIGS. 13 and 14 respectively show a bottom view and a cross-sectional view of an endless track in accordance with yet another embodiment of the invention;

FIGS. 17 and 18 respectively show a top view and a cross-sectional view of an endless track in accordance with yet another embodiment of the invention;

FIGS. 19 and 20 respectively show a top view and a cross-sectional view of an endless track in accordance with yet another embodiment of the invention;

FIGS. 21 and 22 respectively show a top view and a cross-sectional view of an endless track in accordance with yet another embodiment of the invention; and FIGS. 23 and 24 respectively show a top view and a cross-sectional view of an endless track in accordance with yet another embodiment of the invention.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
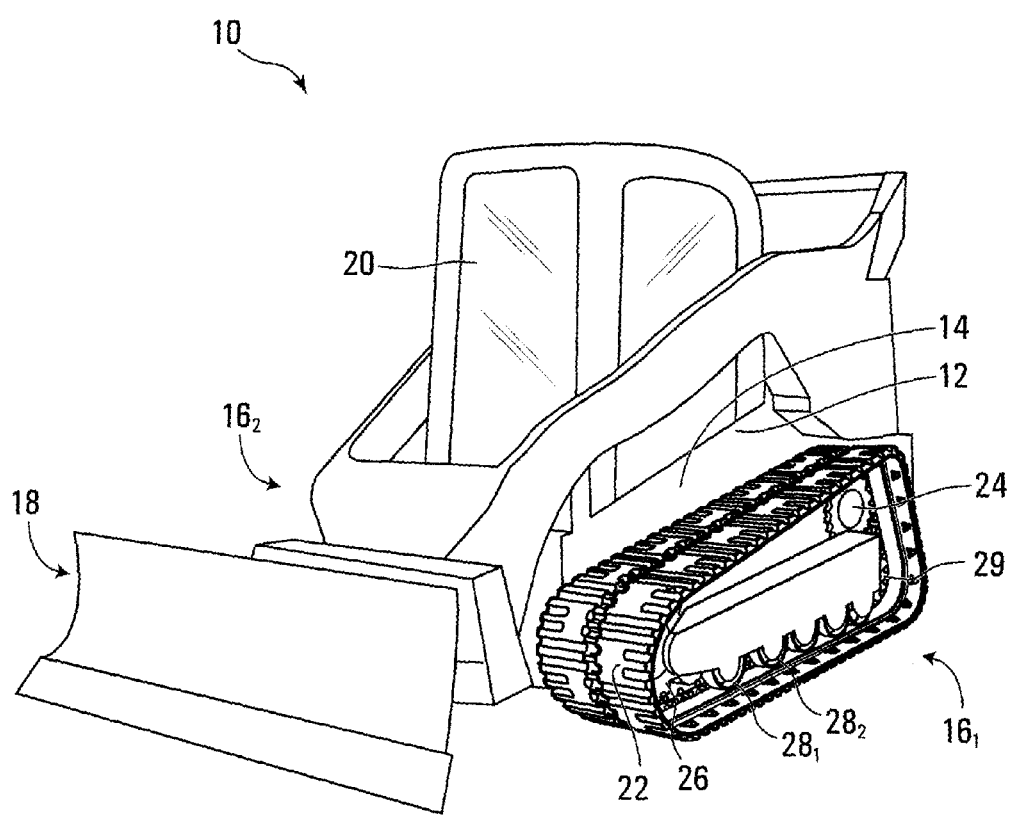
FIG. 1 shows a work vehicle in accordance with an embodiment of the invention.

FIG. 1 shows a work vehicle 10 in accordance with an embodiment of the invention. In this embodiment, the work vehicle 10 is a construction vehicle designed to perform construction work. More specifically, in this example, the construction vehicle 10 is a loader. In other examples, the construction vehicle 10 may be a bulldozer, a backhoe loader, an excavator, or any other type of construction vehicle.

The construction vehicle 10 comprises a frame 12 supporting a prime mover 14, a pair of track assemblies $16_1$, $16_2$ (which can be referred to as "undercarriages"), and an operator cabin 20, from which an operator can control the construction vehicle 10 to move it on the ground and perform construction work using a working implement 18.

The prime mover 14 is a source of motive power to move the construction vehicle 10. For example, the prime mover 14 may comprise an internal combustion engine and/or one or more other types of motors (e.g., electric motors, etc.) for generating motive power to move the construction vehicle 10. The prime mover 14 is in a driving relationship with each of the track assemblies $16_1$, $16_2$. That is, power derived from the primer mover 14 is transmitted to each of the track assemblies $16_1$, $16_2$ via a powertrain of the construction vehicle 10.

The working implement 18 is used to perform construction work. In this embodiment where the construction vehicle 10 is a loader, the working implement 18 is a dozer blade that can be used to push objects and shove soil, debris or other material. In other embodiments, depending on the type of construction vehicle, the working implement 18 may take on various other forms, such as a backhoe, a bucket, a fork, a grapple, a scraper pan, an auger, a saw, a ripper, a material handling arm, or any other type of construction working implement.

The operator cabin 20 is where the operator sits and controls the construction vehicle 10. More particularly, the operator cabin 20 comprises a set of controls that allow the operator to steer the construction vehicle 10 on the ground and perform construction work using the working implement 18.

Figure 2:
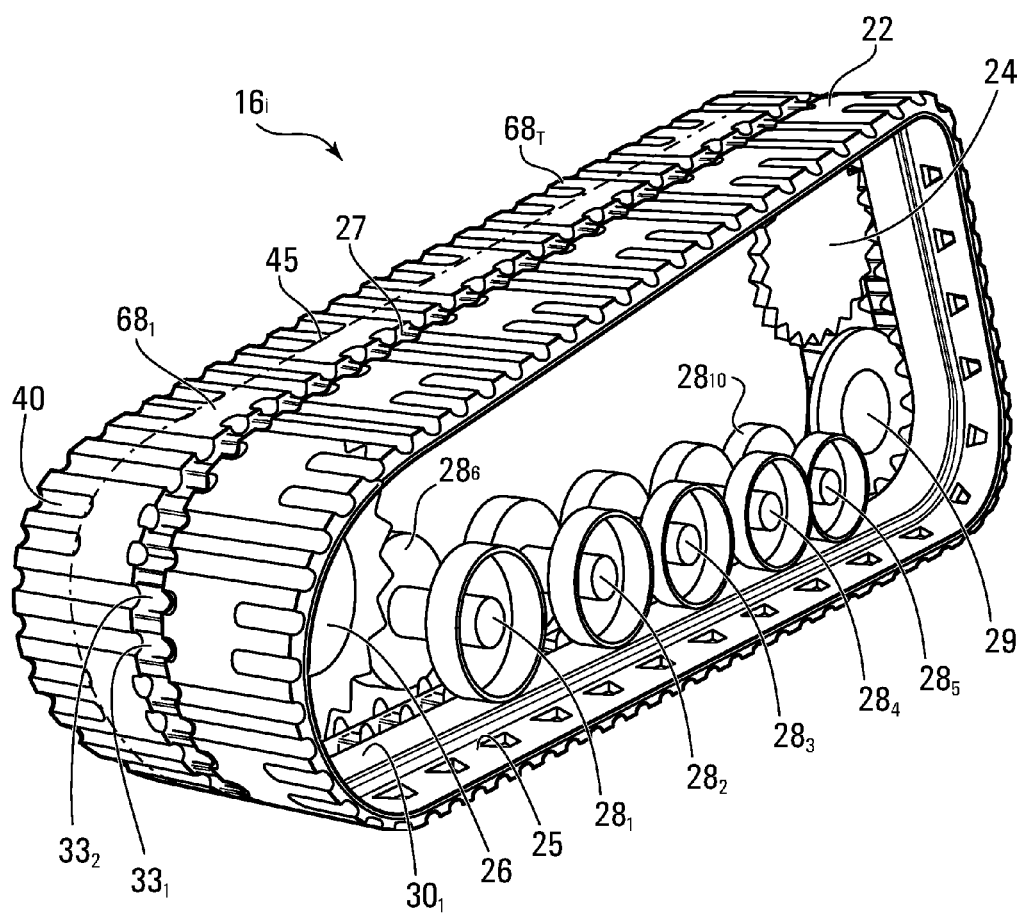
FIG. 2 shows a track assembly of the work vehicle.

The track assemblies $16_1$, $16_2$ are drivable by the prime mover 14 to propel the construction vehicle 10 on the ground. With additional reference to FIG. 2, in this embodiment, each track assembly $16_i$ comprises an endless track 22 disposed around a plurality of wheels, including a drive wheel 24, a front idler wheel 26, a rear idler wheel 29, and a plurality of roller wheels $28_1$-$28_{10}$.

The drive wheel 24 is rotatable by power derived from the prime mover 14 for imparting movement of the endless track 22 in order to propel the construction vehicle 10 on the ground. The idler wheels 26, 29 and the roller wheels $28_1$-$28_{10}$ do not convert power supplied by the prime mover 14 to motive force, but rather guide the endless track 22 and/or maintain it under tension as it is driven by the drive wheel 24. As the endless track 22 is driven by the drive wheel 24, the roller wheels $28_1$-$28_{10}$ roll on a bottom run of the endless track 22 to apply it on the ground for traction.

Figure 3:
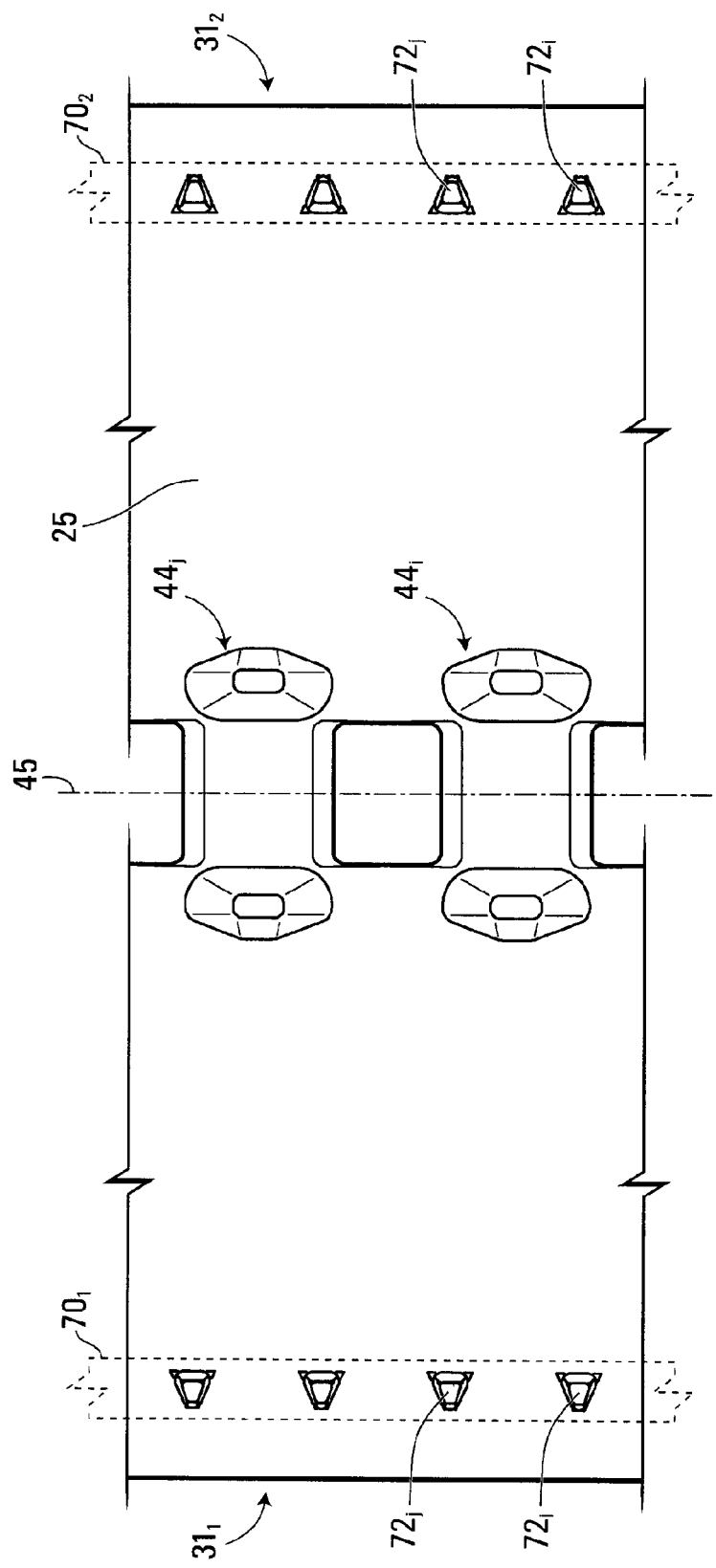
FIGS. 3 and 4 respectively show a top view and a cross-sectional view of an endless track of the track assembly.
Figure 4:
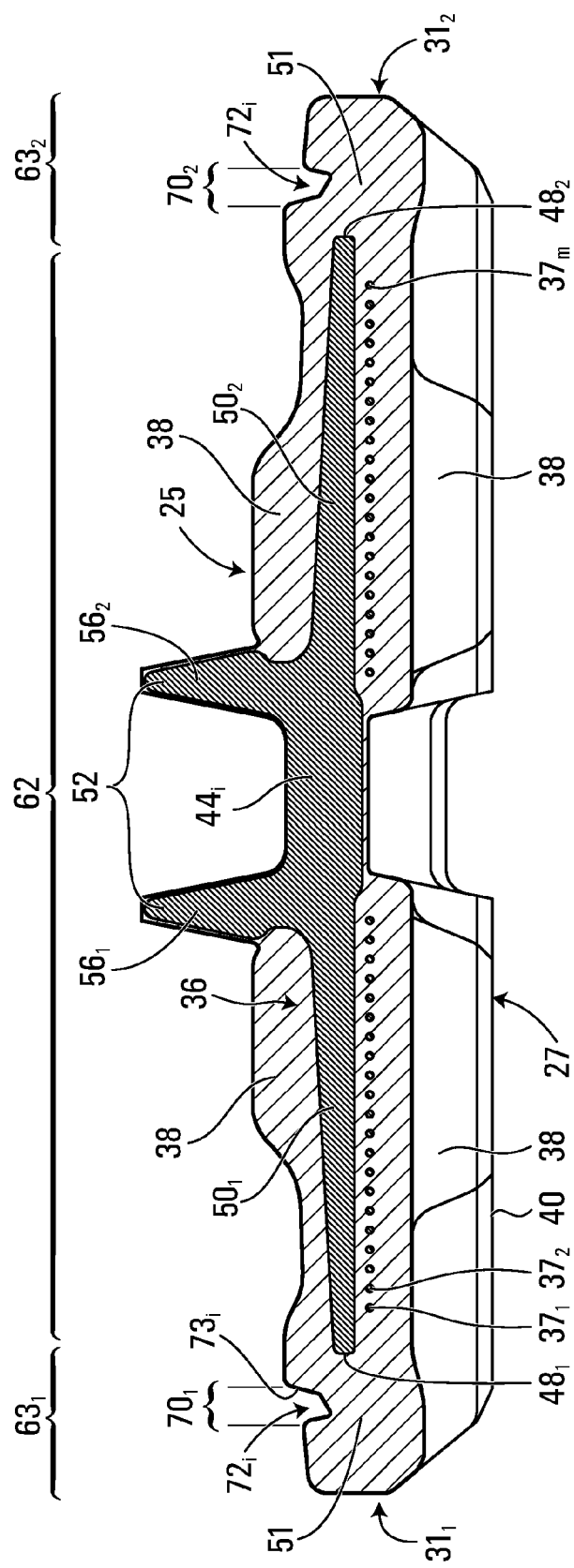
Figure 5:
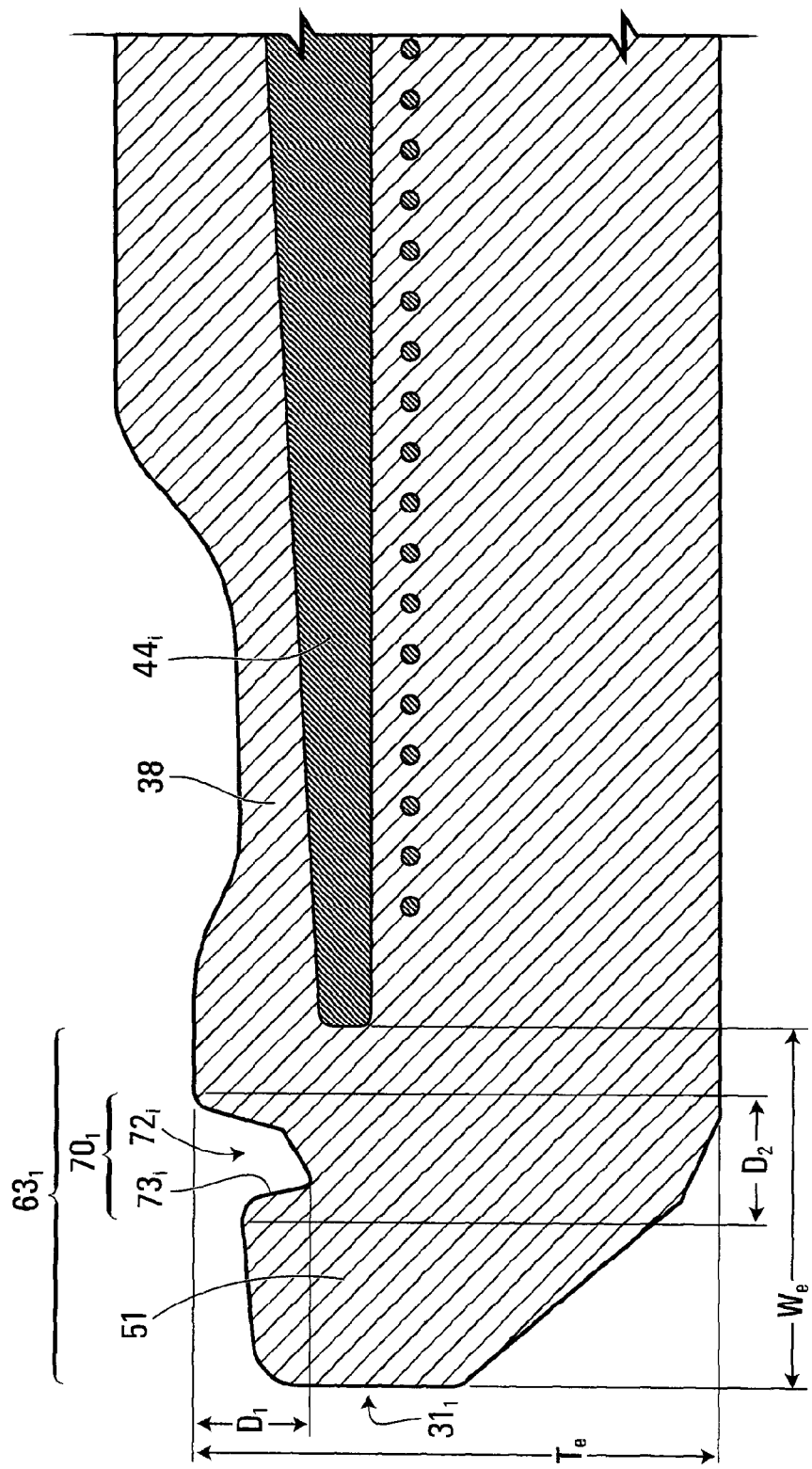
FIG. 5 shows a close-up view of a lateral edge part of the endless track.

The endless track 22 provides traction to the construction vehicle 10. With additional reference to FIGS. 3 to 5, the endless track 22 comprises an inner side 25, a ground-engaging outer side 27, a first lateral edge $31_1$, and a second lateral edge $31_2$. The inner side 25 faces the wheels 24, 26, 29, $28_1$-$28_{10}$ and defines an inner area of the track assembly $16_i$ in which these wheels rotate. The ground-engaging outer side 27 engages the ground for traction of the construction vehicle 10.

The endless track 22 has a length defining a longitudinal axis 45 and a width defined by its lateral edges $31_1$, $31_2$. The endless track 22 thus has a longitudinal direction (i.e., a direction generally parallel to the longitudinal axis 45) and transversal directions (i.e., directions transverse to the longitudinal axis 45), including a widthwise direction (i.e., a lateral direction generally perpendicular to the longitudinal axis 45). The endless track 22 also has a thickness which defines a thickness direction thereof.

The inner side 25 of the endless track 22 contacts the wheels 24, 26, 29, $28_1$-$28_{10}$ as the track 22 is in motion around these wheels. Motion of the endless track 22 is imparted by the drive wheel 24. More particularly, in this embodiment, the drive wheel 24 is a drive sprocket and the endless track 22 has a plurality of openings $33_1$-$33_N$ which cooperate with teeth of the drive wheel 24 in order to drive the endless track 22. As it is driven, the endless track 22 contacts the idler wheels 26, 29 and the roller wheels $28_1$-$28_{10}$ which help guide the track 22 and maintain it under tension. The inner side 25 comprises rolling surfaces $30_1$, $30_2$ on which the roller wheels $28_1$-$28_{10}$ roll to apply the track 22 onto the ground.

The ground-engaging outer side 27 comprises a tread 40 to enhance traction on the ground. The tread 40 comprises a plurality of traction projections $68_1$-$68_T$ distributed on the ground-engaging outer side 27 for enhancing traction on the ground. The tread 40 may have any suitable configuration.

The endless track 22 comprises an elastomeric body 36 underlying the inner side 25 and the ground-engaging outer side 27. In view of its underlying nature, the elastomeric body 36 will be referred to as a "carcass". The carcass 36 is elastomeric in that it comprises elastomeric material 38. A plurality of cores $44_1$-$44_N$ are at least partially embedded in the elastomeric material 38. Also, in this embodiment, a layer of reinforcing cables $37_1$-$37_M$ is embedded in the elastomeric material 38. The carcass 36 may comprise one or more additional and/or different components, such as one or more other reinforcements (e.g., one or more layers of reinforcing fabrics), embedded in the elastomeric material 38, in other embodiments.

The elastomeric material 38 allows the carcass 36 to elastically change in shape as the endless track 22 is in motion around the wheels 24, 26, 29, $28_1$-$28_{10}$. The elastomeric material 38 can be any polymeric material with the property of elasticity. In this embodiment, the elastomeric material 38 includes rubber. Various rubber compounds may be used and, in some cases, different rubber compounds may be present in different areas of the carcass 36. In other embodiments, the elastomeric material 38 may include another elastomer in addition to or instead of rubber (e.g., polyurethane elastomer).

The reinforcing cables $37_1$-$37_M$ extend generally parallel to one another and in the longitudinal direction of the endless track 22 to enhance strength in tension of the track 22 along its longitudinal direction. In this embodiment, each of the reinforcing cables $37_1$-$37_M$ is a cord or wire rope including a plurality of strands or wires. In other embodiments, each of the reinforcing cables $37_1$-$37_M$ may be another type of cable and may be made of any suitable material (e.g., metal, plastic, or composite material).

The cores $44_1$-$44_N$ are distributed along and extend transversely to the longitudinal direction of the endless track 22 to impart transverse rigidity to the endless track 22. The cores $44_1$-$44_N$ also help to guide some of the wheels 24, 26, 29, $28_1$-$28_{10}$ as the endless track 22 is driven by the drive wheel 24.

Each core $44_i$, has a longitudinal axis extending transversally (in this case, perpendicularly) to the longitudinal axis 45 of the endless track 22. The core $44_i$ has a length which is shorter than the width of the endless track 22 such that it has a first longitudinal end $48_1$ and a second longitudinal end $48_2$ that are spaced apart from the lateral edges $31_1$, $31_2$ of the endless track 22. That is, the first longitudinal end $48_1$ of the core $44_i$ is spaced apart from the first lateral edge $31_1$ of the endless track 22 along the track's widthwise direction, and the second longitudinal end $48_2$ of the core $44_i$ is spaced apart from the second lateral edge $31_2$ of the endless track 22 along the track's widthwise direction.

More particularly, in this embodiment, each core $44_i$ comprises a pair of wings $50_1$, $50_2$ and a wheel guide 52.

The wings $50_1$, $50_2$ are elongated along the longitudinal axis of the core $44_i$ to impart transverse rigidity to the endless track 22. Each of the wings $50_1$, $50_2$ has a top surface oriented towards the inner side 25 of the endless track 22 and a bottom surface oriented towards the ground-engaging outer side 27 of the endless track 22. In this embodiment, each of the wings $50_1$, $50_2$ has a tapered shape whereby its top surface converges longitudinally outwardly towards its bottom surface. The wings $50_1$, $50_2$ may have various other shapes in other embodiments.

The wheel guide 52 serves to guide some of the wheels 24, 26, 29, $28_1$-$28_{10}$ as the endless track 22 is driven by the drive wheel 24. More particularly, in this embodiment, the wheel guide 52 comprises a pair of guide projections $56_1$, $56_2$ that project on the inner side 25 of the endless track 22. Each guide projection $56_i$ comprises a top end, a base, and a pair of wheel-facing sides opposite one another and extending from its base to its top end. The wheel guide 52 may be configured in various other ways in other embodiments (e.g., it may comprise only one guide projection or more than two (2) guide projections).

In this embodiment, the core $44_i$, including its wings $50_1$, $50_2$ and wheel guide 52, is made of metal (e.g., steel) formed into shape by casting. The core $44_i$ may have various other shapes, may comprise various other components, may be made of various other rigid materials (e.g., polymers, ceramics, composites, etc.), and/or may be made using various other processes (e.g., forging, welding, fastening, etc.) in other embodiments.

The endless track 22 comprises a central part 62 between a first lateral edge part $63_1$ and a second lateral edge part $63_2$. The central part 62 is located between the longitudinal ends $48_1$, $48_2$ of the cores $44_1$-$44_N$. The first lateral edge part $63_1$ is located between the first lateral edge $31_1$ and the cores $44_1$-$44_N$ (i.e., between the first lateral edge $31_1$ and the first longitudinal ends $48_1$ of the cores $44_1$-$44_N$). The second lateral edge part $63_2$ is located between the second lateral edge $31_2$ and the cores $44_1$-$44_N$ (i.e., between the second lateral edge $31_2$ and the second longitudinal ends $48_2$ of the cores $44_1$-$44_N$).

As the construction vehicle 10 moves on the ground, a lateral edge part $63_i$ of the endless track 22 may impact (i.e., make contact with) an obstacle on the ground (e.g., a curb, a sidewalk, a rock, an abrupt change in ground level, etc.). This creates stresses which may lead to premature wear of the endless track 22. More particularly, in this embodiment, this creates stresses in the rubber 38 of the lateral edge part $63_i$ which, if too large, could lead to "edge-cutting" of the edge part $63_i$, i.e., a process in which the rubber 38 of the edge part $63_i$ tears.

In order to enhance a wear resistance of the endless track 22, and particularly a resistance to edge-cutting, in this embodiment, the first lateral edge part $63_1$ comprises a first impact absorber $70_1$ and the second lateral edge part $63_2$ comprises a second impact absorber $70_2$. The first impact absorber $70_1$ will be described in further detail, with an understanding that a similar description applies to the second impact absorber $70_2$.

The impact absorber $70_1$ is a shield (i.e., a protective element) that protects the lateral edge part $63_1$ of the endless track 22 against wear due to an impact with an obstacle on the ground. In particular, in this embodiment, the impact absorber $70_1$ protects the lateral edge part $63_1$ of the endless track 22 against edge-cutting. That is, the impact absorber $70_1$ makes the lateral edge part $63_1$ more resistant (i.e., less susceptible) to edge-cutting than if the endless track 22 lacked the impact absorber $70_1$ but was otherwise identical.

More specifically, the impact absorber $70_1$ is located between the lateral edge $31_1$ and the cores $44_1$-$44_N$ to facilitate an elastic deformation of the lateral edge part $63_1$ when the lateral edge part $63_1$ impacts an obstacle on the ground. In this case, the impact absorber $70_1$ facilitates an elastic deformation of a portion 51 of the rubber 38 between the lateral edge $31_1$ and the cores $44_1$-$44_N$ when the lateral edge part $63_1$ impacts an obstacle on the ground. The elastic deformation of the portion 51 of the rubber 38 protects against tearing of the portion 51 of the rubber 38. Thus, the impact absorber $70_1$ protects the portion 51 of the rubber 38 against tearing in that it makes the portion 51 of the rubber 38 more resistant (i.e., less susceptible) to tearing when the lateral edge part $63_1$ impacts an obstacle on the ground than if the endless track 22 lacked the impact absorber $70_1$ but was otherwise identical.

The impact absorber $70_1$ can be viewed as constituting an anti-tear zone opposing development of a tear of the portion 51 of the rubber 38 between the lateral edge $31_1$ and the cores $44_1$-$44_N$ when the lateral edge part $63_1$ impacts an obstacle on the ground.

In some cases, the impact absorber $70_1$ may oppose development of a tear of the portion 51 of the rubber 38 between the lateral edge $31_1$ and the cores $44_1$-$44_N$ by preventing such a tear from arising.

In other cases, the impact absorber $70_1$ may not necessarily be able to prevent a tear of the portion 51 of the rubber 38 between the lateral edge $31_1$ and the cores $44_1$-$44_N$ from arising, but nevertheless opposes development of the tear. For example, the impact absorber $70_1$ may cause the tear to appear after a longer period of time than if the endless track 22 lacked the impact absorber $70_1$ but was otherwise identical. As another example, the impact absorber $70_1$ may cause a growth rate of the tear to be slower than if the endless track 22 lacked the impact absorber $70_1$ but was otherwise identical. As yet another example, the impact absorber $70_1$ may cause a size of the tear to be smaller after a given period of time than if the endless track 22 lacked the impact absorber $70_1$ but was otherwise identical. To evaluate the effectiveness of the impact absorber $70_1$ at opposing development of a tear of the portion 51 of the rubber 38 between the lateral edge $31_1$ and the cores $44_1$-$44_N$, testing can be conducted on the endless track 22 and a reference endless track that lacks the impact absorber $70_1$ but is otherwise identical to the endless track 22.

The impact absorber $70_1$ reduces a level of stress in the portion 51 of the rubber 38 between the lateral edge $31_1$ and the cores $44_1$-$44_N$ when the lateral edge part $63_1$ impacts an obstacle on the ground. That is, when the lateral edge part $63_1$ impacts an obstacle on the ground, the impact absorber $70_1$ causes the portion 51 of the rubber 38 between the lateral edge $31_1$ and the cores $44_1$-$44_N$ to experience a level of stress lower than that which would be experienced by the portion 51 of the rubber 38 if the endless track 22 lacked the impact absorber $70_1$ but was otherwise identical. In that sense, the impact absorber $70_1$ can be viewed as a form of stress relief in this case.

The impact absorber $70_1$ may be configured in various ways in various embodiments.

For example, in this embodiment, the impact absorber $70_1$ comprises a plurality of holes $72_1$-$72_M$ distributed along the longitudinal direction of the endless track 22. Each hole $72_i$ is an internal space unfilled by the portion 51 of the rubber 38 between the lateral edge $31_1$ and the cores $44_1$-$44_N$ and delimited by an internal surface $73_i$ of the portion 51 of the rubber 38 between the lateral edge $31_1$ and the cores $44_1$-$44_N$. In this case, the hole $72_i$ is an open cavity (i.e., a cavity open at a periphery of the track 22). In other cases, the hole $72_i$ may be a closed cavity (i.e., a cavity which does not extend to the periphery of the track 22).

The holes $72_1$-$72_M$ reduces a level of stress in the portion 51 of the rubber 38 between the lateral edge $31_1$ and the cores $44_1$-$44_N$ when the lateral edge part $63_1$ impacts an obstacle on the ground (i.e., the portion 51 of the rubber 38 experiences a level of stress lower than that which it would experience if the endless track 22 lacked the holes $72_1$-$72_M$ but was otherwise identical). This opposes development of a tear of the portion 51 of the rubber 38 between the lateral edge $31_1$ and the cores $44_1$-$44_N$ and therefore helps to protect against edge-cutting.

The holes $72_1$-$72_M$ may be configured in various ways in order to provide a tear protection effect.

For example, the holes $72_1$-$72_M$ may extend in various manners in the lateral edge part $63_1$ of the endless track 22. In this embodiment, each hole $72_i$ extends inwardly from the inner side 25 of the endless track 22. In other embodiments, each hole $72_i$ may extend inwardly from the ground-engaging outer side 27 of the endless track 22, may extend inwardly from the lateral edge $31_1$ of the endless track 22, or may be a closed cavity that does not extend to the periphery of the endless track 22.

The holes $72_1$-$72_M$ may have various shapes. In this embodiment, each hole $72_i$ has a generally triangular shape (when viewed from the inner side 25 of the track 22) that tapers in the thickness direction of the endless track 22. Each hole $72_i$ may have any other suitable shape in other embodiments. Also, different ones of the holes $72_1$-$72_M$ may be shaped differently in some embodiments.

The holes $72_1$-$72_M$ may have various dimensions. For instance, the hole $72_i$ has a dimension $D_1$ measured along the thickness direction of the endless track 22 (in this embodiment, the dimension $D_1$ is a depth). The dimension $D_1$ may take on various values. For example, in some embodiments, the dimension $D_1$ may be at least 5%, in some cases at least 10%, in some cases at least 15%, in some cases at least 20%, in some cases at least 25%, and in some cases at least 30% of a thickness $T_e$ of the lateral edge part $63_1$. Also, the hole $72_i$ has a dimension $D_2$ measured along the widthwise direction of the endless track 22. The dimension $D_2$ may take on various values. For example, in some embodiments, the dimension $D_2$ may be at least 5%, in some cases at least 10%, in some cases at least 15%, in some cases at least 20%, in some cases at least 25%, and in some cases at least 30% of a width $W_e$ of the lateral edge part $63_1$.

The holes $72_1$-$72_M$ may be distributed in various manners along the longitudinal direction of the endless track 22. In this embodiment, the holes $72_1$-$72_M$ are distributed such that there is at least one (1) hole, in this case two (2) holes, aligned with each of the cores $44_1$-$44_N$. In other embodiments, the holes $72_1$-$72_M$ may be distributed such that one or more holes are not aligned with any of the cores $44_1$-$44_N$.

The holes $72_1$-$72_M$ may be provided in the endless track 22 in various ways. For example, in this embodiment, the holes $72_1$-$72_M$ may be molded during molding of the endless track 22. In other embodiments, the holes $72_1$-$72_M$ may be machined (e.g., drilled, reamed, carved) into the endless track 22 after it has been molded.

Figure 6:
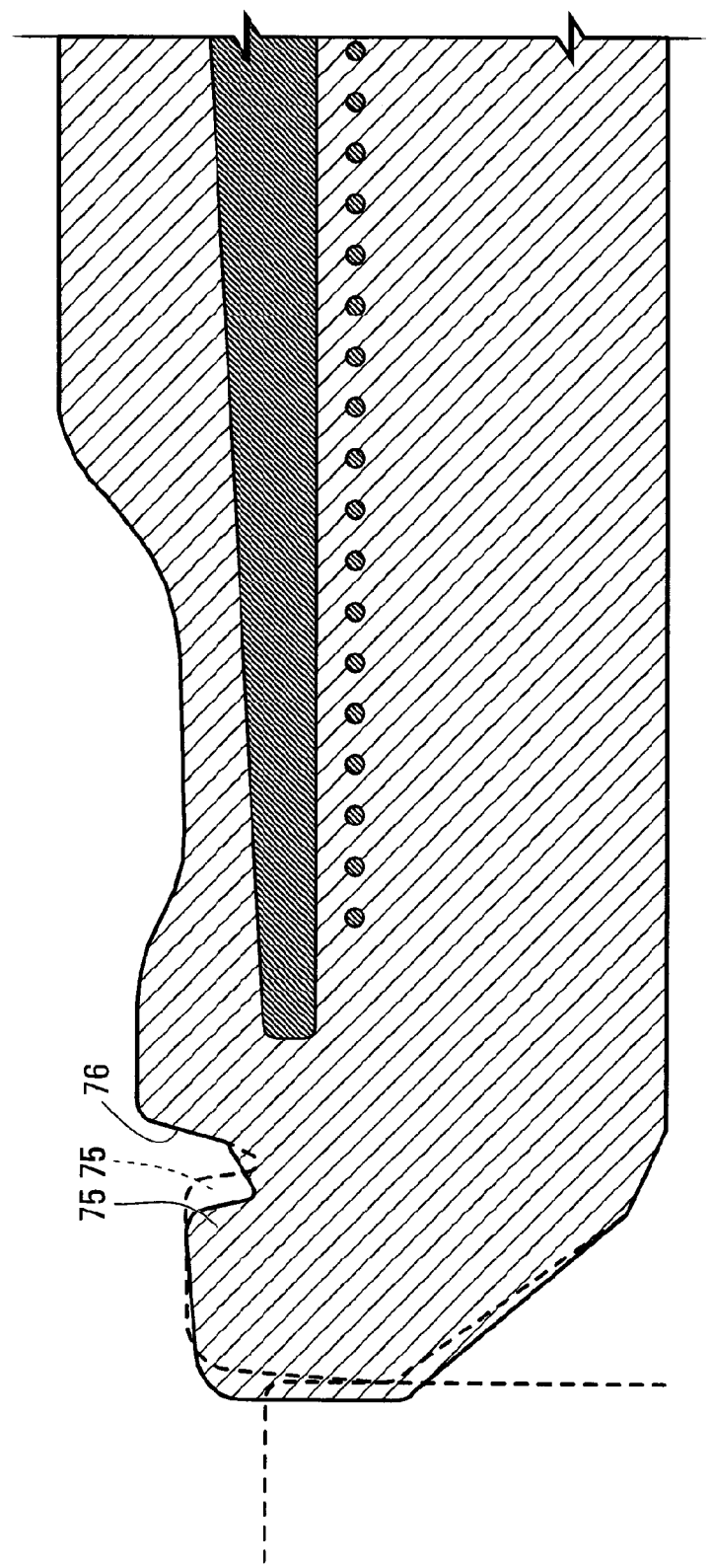
FIG. 6 shows an example of an elastic deformation of the lateral edge part of the endless track.

As shown in FIG. 6, when the lateral edge part $63_1$ of the endless track 22 impacts an obstacle on the ground, each hole $72_i$ that is located in a segment of the endless track 22 which contacts the obstacle facilitates an elastic deformation of the portion 51 of the rubber 38 between the lateral edge $31_1$ and the cores $44_1$-$44_N$. Specifically, the hole $72_i$ is deformable (i.e., changeable in shape), in this case shrinkable, to facilitate the elastic deformation of the portion 51 of the rubber 38. The portion 51 of the rubber 38 thus elastically deforms in such a way that it causes the hole $72_i$ to at least partially close. Basically, in this embodiment, being an open cavity filled with ambient air, the hole $72_i$ acts as an air cushion to absorb energy when the lateral edge part $63_1$ of the endless track 22 impacts an obstacle on the ground.

The hole $72_i$ directs the elastic deformation of the portion 51 of the rubber 38. More particularly, the hole $72_i$ provides a void which offers a path of least resistance to the elastic deformation of the portion 51 of the rubber 38. As such, a part 75 of the rubber 38 between the hole $72_i$ and the lateral edge $31_1$ moves towards a part 76 of the rubber 38 between the hole $72_i$ and the cores $44_1$-$44_N$. Thus, the hole $72_i$ collapses as opposing areas of the internal surface $73_i$ defining the hole $72_i$ move towards one another.

The hole $72_i$ reduces the level of stress in the portion 51 of the rubber 38 by facilitating movement of different parts of the portion 51 of the rubber 38 between the lateral edge $31_1$ and the cores $44_1$-$44_N$. Also, the hole $72_i$ reduces a likelihood of the part 76 of the rubber 38 between the hole $72_i$ and the cores $44_1$-$44_N$ being sheared against the cores $44_1$-$44_N$. By relieving stress in the portion 51 of the rubber 38, the hole $72_i$ protects against tearing of the portion 51 of the rubber 38.

Figure 16:
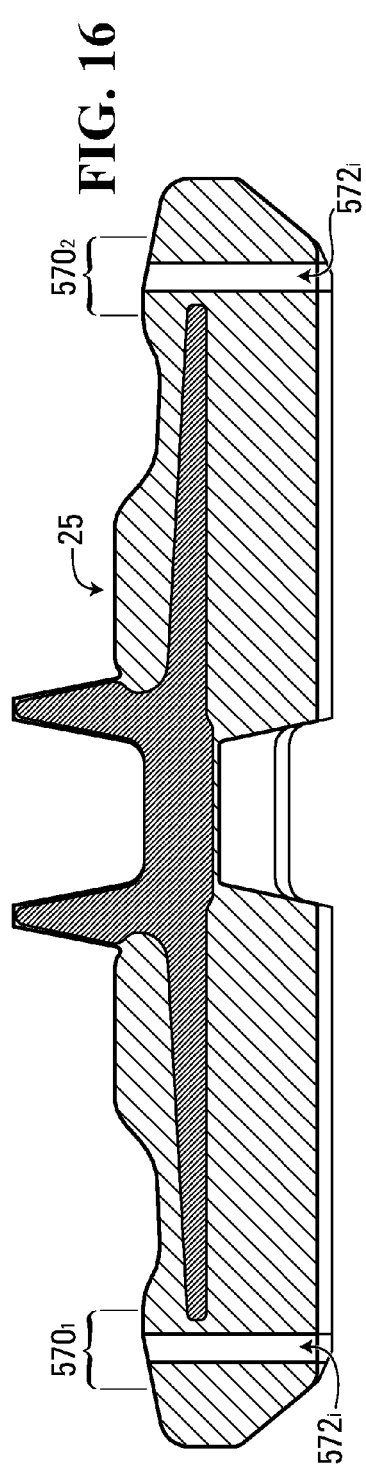
FIGS. 15 and 16 respectively show a bottom view and a cross-sectional view of an endless track in accordance with yet another embodiment of the invention.
Figure 15:
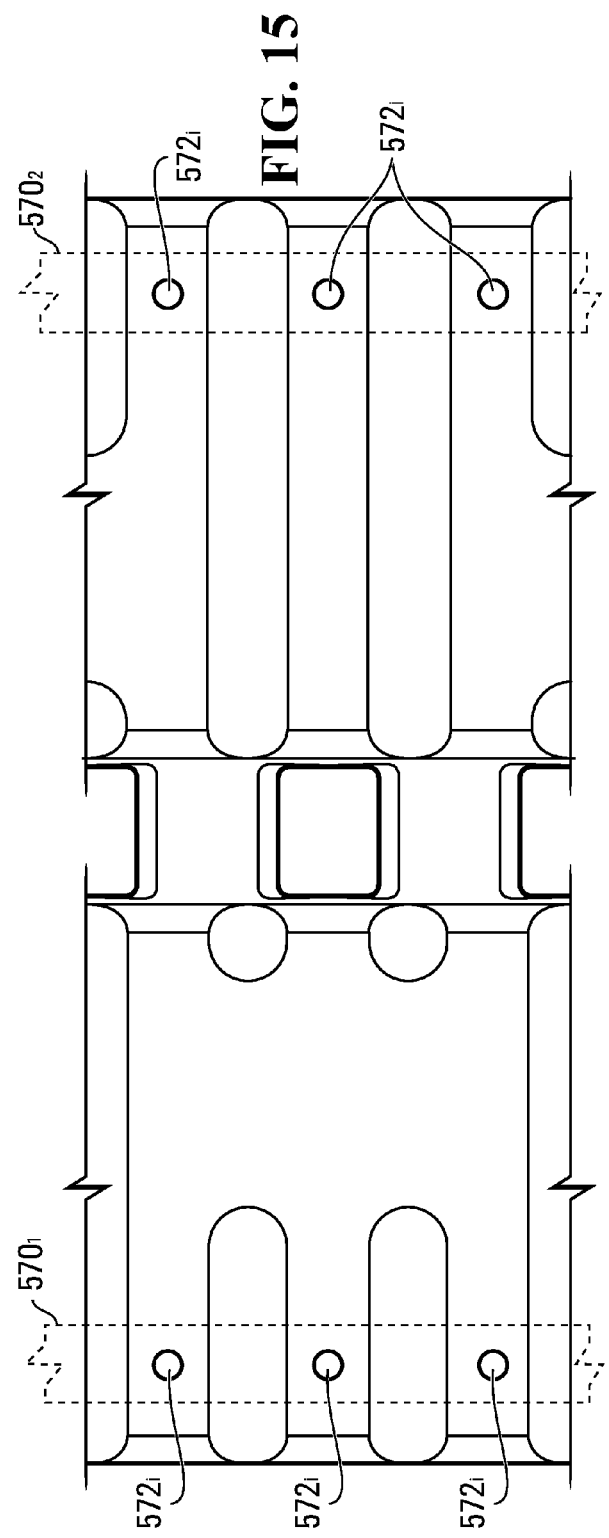

Although they are configured in a particular way in this embodiment, the holes $72_1$-$72_M$ may be configured in various other ways in other embodiments, as mentioned above. For instance, FIGS. 7 to 20 show examples of different configurations of holes such as the holes $72_1$-$72_M$ in other embodiments. More particularly:

FIGS. 7 and 8 show an embodiment in which the impact absorber $170_1$ comprises a plurality of holes $172_1$-$172_P$ each having an elongate shape that is elongated along the longitudinal direction of the endless track 22;

FIGS. 9 and 10 show an embodiment in which the impact absorber $270_1$ comprises a plurality of holes $272_1$-$272_P$ each having an elongate shape that is elongated along the longitudinal direction of the endless track 22 and that has longitudinal ends deeper than a central section;

FIGS. 11 and 12 show an embodiment in which the impact absorber $370_1$ comprises a plurality of holes $372_1$-$372_S$ which are arranged in two (2) rows spaced apart from one another along the widthwise direction of the endless track 22;

FIGS. 13 and 14 show an embodiment in which the impact absorber $470_1$ comprises a plurality of holes $472_1$-$472_M$ each extending inwardly from the ground-engaging side 27 of the endless track 22;

FIGS. 15 and 16 show an embodiment in which the impact absorber $570_1$ comprises a plurality of holes $572_1$-$572_M$ each extending through the endless track 22 from its inner side 25 to its ground-engaging side 27;

FIGS. 17 and 18 show an embodiment in which the impact absorber $670_1$ comprises a plurality of holes $672_1$-$672_M$ each extending inwardly from the lateral edge $31_1$ of the endless track 22; and FIGS. 19 and 20 show an embodiment in which the impact absorber $770_1$ comprises a plurality of holes $772_1$-$772_M$ each being a closed cavity that does not extend to a periphery of the endless track 22. The holes $772_1$-$772_M$ may be provided, for instance, by leaving openings in one or more sheets of rubber that are positioned in a mold in which the endless track 22 is molded such that, after molding, these openings form the holes $772_1$-$772_M$.

While the impact absorber (e.g., $70_1$ ... $770_1$) has a certain number of holes in embodiments considered above, the impact absorber may have any number of holes such as the holes $72_1$-$72_M$. In some cases, the impact absorber may have a single hole such as the holes $72_1$-$72_M$. For example, FIGS. 21 and 22 show an embodiment in which the impact absorber $1070_1$ has a single hole 1072 configured as a groove which runs along a majority (e.g., an entirety) of the length of the endless track 22. As another example, FIGS. 23 and 24 shows an embodiment in which the impact absorber $1170_1$ has a single hole 1172 configured as a closed channel which runs along a majority (e.g., an entirety) of the length of the endless track 22. The hole 1172 may be provided, for instance, by leaving an opening in one or more sheets of rubber that are positioned in a mold in which the endless track 22 is molded such that, after molding, this opening forms the hole 1172.

Although in this embodiment it is empty, in other embodiments, each hole $72_i$ may contain a filler, which includes something (other than air) that fills all or less than all of the hole $72_i$ and that facilitates the elastic deformation of the portion 51 of the rubber 38 between the lateral edge $31_1$ and the cores $44_1$-$44_N$ when the lateral edge part $63_1$ impacts an obstacle on the ground.

Figure 25:
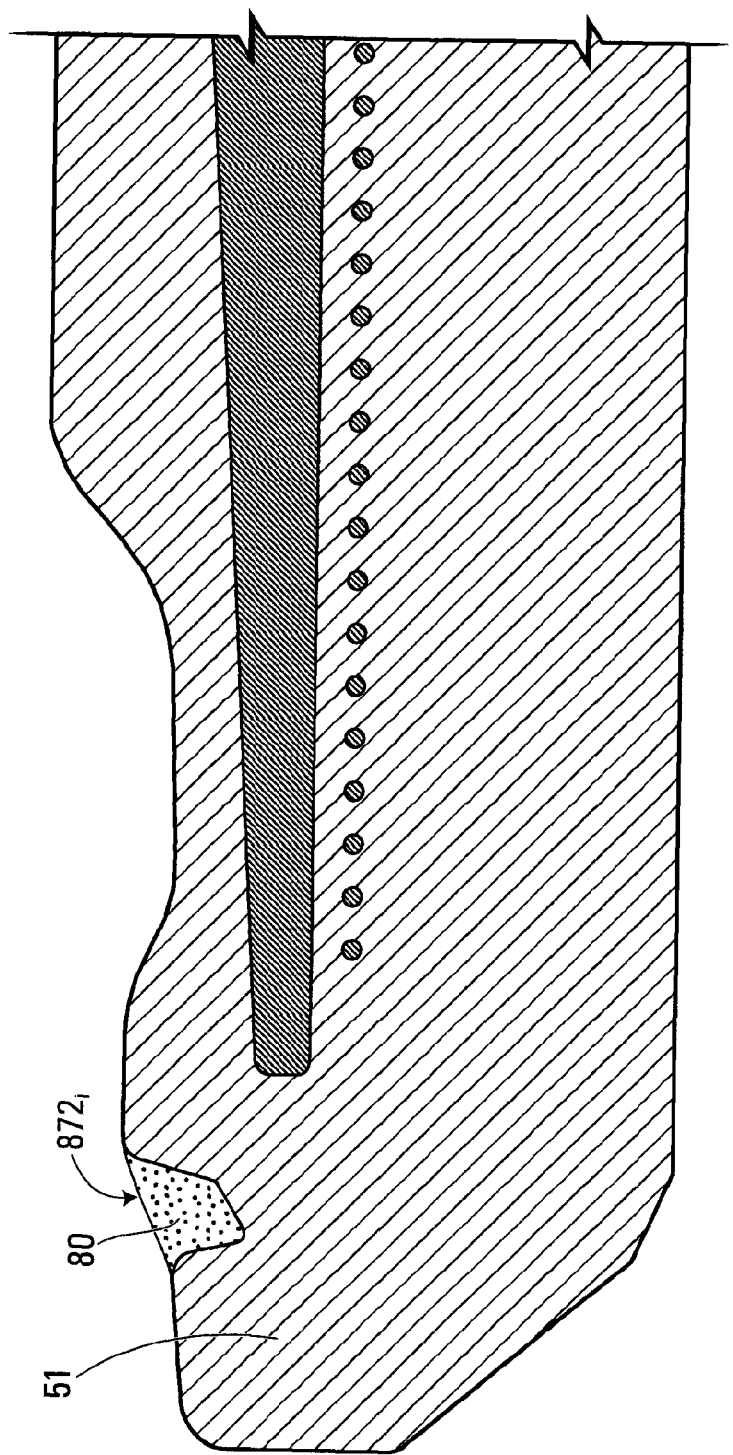
FIGS. 25 and 26 respectively show alternative embodiments in which a hole in the lateral edge part contains a filler.
Figure 26:
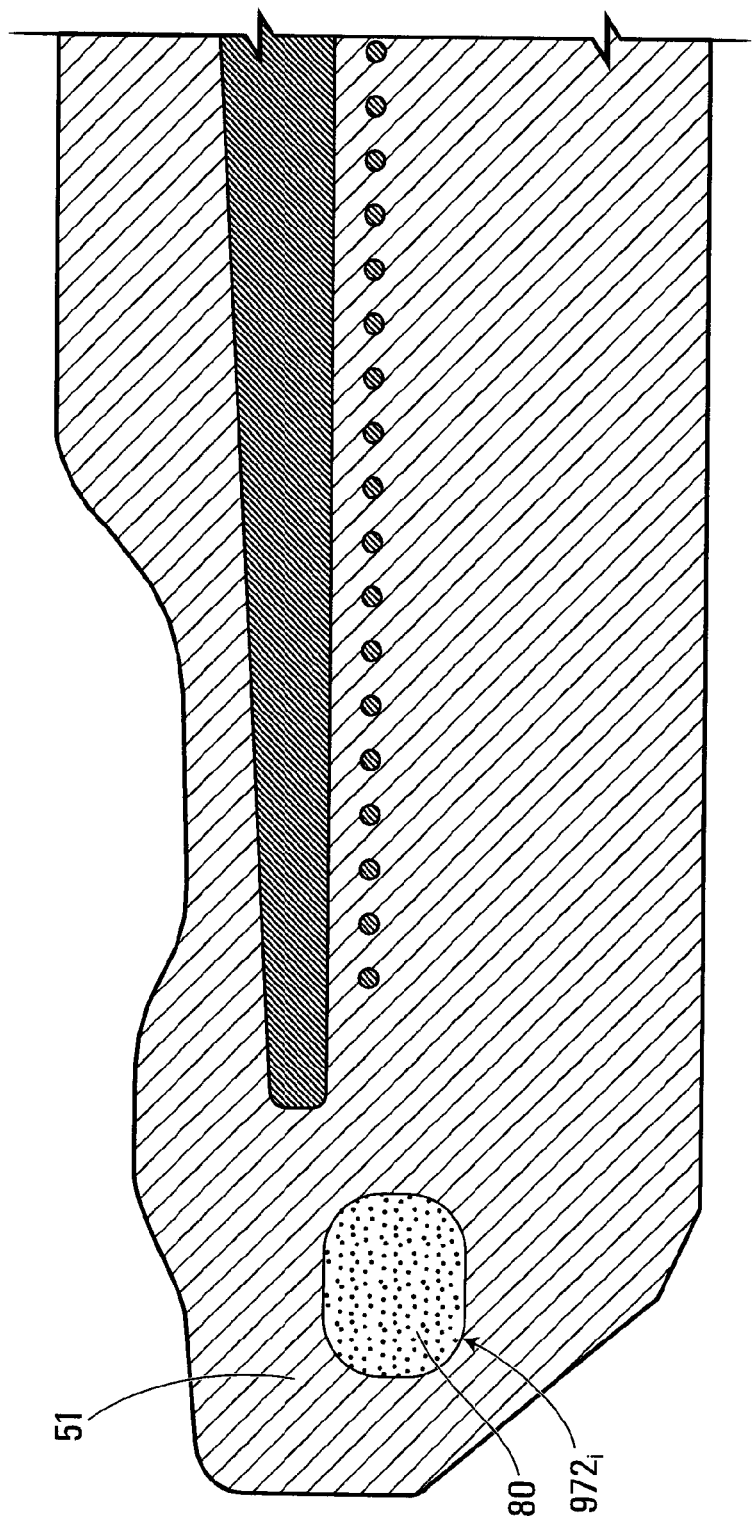

For example, in some embodiments, as shown in FIGS. 25 and 26, a hole $872_i$, $972_i$ may contain a filler 80 which is a solid material (i.e., material neither liquid nor gaseous). The filler 80 may include an elastomer (e.g., a foam rubber or another soft rubber, a polyurethane foam, etc.) or some other elastic material and may fill all or less than all of the hole $872_i$, $972_i$. The filler 80 may be provided in the endless track 22 in various ways. For instance, in some cases, the filler 80 may be provided by molding it in the hole $872_i$, $972_i$ during molding of the endless track 22. In other cases, the filler 80 may be provided by affixing it in the hole $872_i$, $972_i$ using a suitable adhesive.

The filler 80 may be more elastic (i.e., have a greater elasticity) than the portion 51 of the rubber 38 between the lateral edge $31_1$ and the cores $44_1$-$44_N$. In other words, the filler 80 may have a modulus of elasticity lower than a modulus of elasticity of the portion 51 of the rubber 38 between the lateral edge $31_1$ and the cores $44_1$-$44_N$. For example, in some embodiments, the filler 80 may have a modulus of elasticity that is at least 10%, in some cases at least 20%, in some cases at least 30%, in some cases at least 40%, and in some cases at least 50% lower than that of the portion 51 of the rubber 38 between the lateral edge $31_1$ and the cores $44_1$-$44_N$. Thus, in some embodiments, a ratio of the modulus of elasticity of the filler 80 to the modulus of elasticity of the rubber 38 between the lateral edge $31_1$ and the cores $44_1$-$44_N$ may be no more than 0.9, in some cases no more than 0.8, in some cases no more than 0.7, in some cases no more than 0.6, and in some cases no more than 0.5. In embodiments in which the rubber 38 between the lateral edge $31_1$ and the cores $44_1$-$44_N$ contains different rubber compounds with different moduli of elasticity, the modulus of elasticity of the rubber 38 between the lateral edge $31_1$ and the cores $44_1$-$44_N$ can be taken as an average of these different moduli of elasticity (e.g., a weighted average of these different moduli of elasticity based on the weight of each rubber compound and the total weight of the rubber 38 between the lateral edge $31_1$ and the cores $44_1$-$44_N$). Similarly, in embodiments in which the filler 80 contains different compounds with different moduli of elasticity, the modulus of elasticity of the filler 80 can be taken as an average of these different moduli of elasticity (e.g., a weighted average of these different moduli of elasticity based on the weight of each compound and the total weight of the filler 80).

Alternatively or additionally, the filler 80 may have a hardness (e.g., a durometer or other suitable hardness measure) lower than a hardness of the portion 51 of the rubber 38 between the lateral edge $31_1$ and the cores $44_1$-$44_N$. For instance, in some embodiments, the filler 80 may have a hardness (e.g., a durometer) that is at least 10%, in some cases at least 20%, in some cases at least 30%, in some cases at least 40%, and in some cases at least 50% lower than that of the portion 51 of the rubber 38 between the lateral edge $31_1$ and the cores $44_1$-$44_N$. Thus, in some embodiments, a ratio of the hardness of the filler 80 to the hardness of the rubber 38 between the lateral edge $31_1$ and the cores $44_1$-$44_N$ may be no more than 0.9, in some cases no more than 0.8, in some cases no more than 0.7, in some cases no more than 0.6, and in some cases no more than 0.5. In embodiments in which the rubber 38 between the lateral edge $31_1$ and the cores $44_1$-$44_N$ contains different rubber compounds with different hardness values, the hardness of the rubber 38 between the lateral edge $31_1$ and the cores $44_1$-$44_N$ can be taken as an average of these different hardness values (e.g., a weighted average of these hardness values based on the weight of each rubber compound and the total weight of the rubber 38 between the lateral edge 31$_1$ and the cores 44$_1$-44$_N$). Similarly, in embodiments in which the filler 80 contains different compounds with different hardness values, the modulus of elasticity of the filler 80 can be taken as an average of these different hardness values (e.g., a weighted average of these different hardness values based on the weight of each compound and the total weight of the filler 80).

Figure 27:
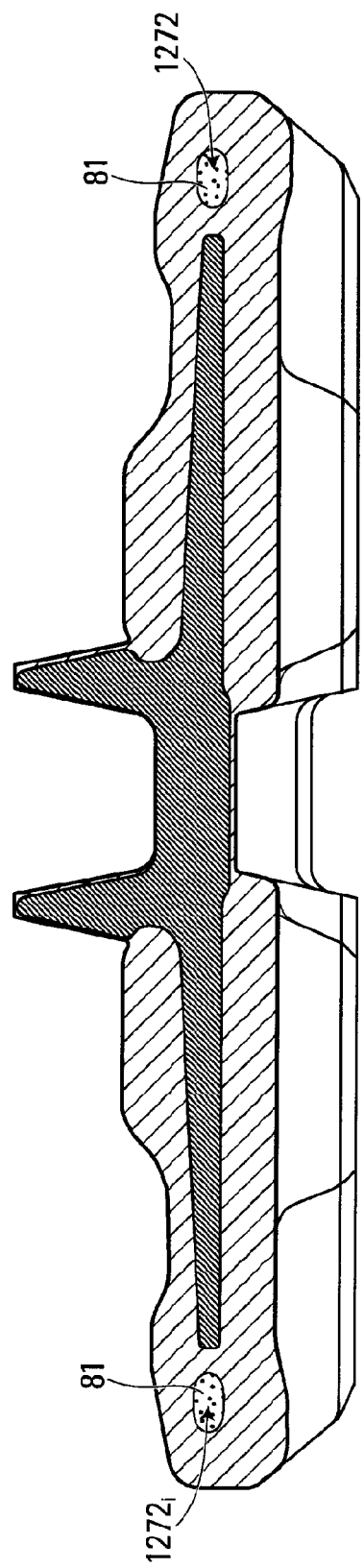
FIG. 27 shows an alternative embodiment in which a hole in the lateral edge part contains a fluid.

As another example, in some embodiments, as shown in FIG. 27, a hole 1272$_i$ may contain a filler 81 which is a fluid (i.e., a liquid or gas). The filler 81 may include a gas (e.g., air or another gas) or a liquid (e.g., water, oil or another liquid) and may fill all or less than all of the hole 1272$_i$. The filler 80 may be provided in the endless track 22 in various ways. For instance, in some cases, the filler 81 may be contained in a capsule, pouch or other container that is provided in the track 22 by placing it, before molding of the track 22, between layers of the rubber 38 where the hole 1272$_i$ is to be formed. In other cases, the filler 80 may be provided in the track 22 by injecting it into the hole 1272$_i$ during or after molding of the track 22.

The filler 80 is confined in the endless track 22 in that it cannot flow out of its confines within the hole 1272$_i$. This is in contrast to embodiments discussed above in which ambient air can freely flow in and out of open cavities such as the holes 72$_1$-72$_M$. The filler 80 may be confined in the endless track 22 in various ways. For instance, in this embodiment, the hole 1272$_i$ which contains the filler 81 is a closed cavity. In other embodiments, a hole containing the filler 81 may be an open cavity (e.g., the hole 872$_j$) in which case the filler 81 is sealed in the open cavity (e.g., by being contained in a capsule, pouch or other container affixed to the open cavity's internal surface using a suitable adhesive, or by closing off the open cavity's opening with a membrane or other suitable closure).

While in this embodiment the impact absorber (e.g., 70$_1$. . . 770$_1$) comprises one or more holes such as the holes 72$_1$-72$_M$, in other embodiments, the impact absorber may not comprise any hole but still facilitate an elastic deformation of the lateral edge part 63$_1$ of the endless track 22 when the lateral edge part 63$_1$ impacts an obstacle on the ground.

Figure 28:
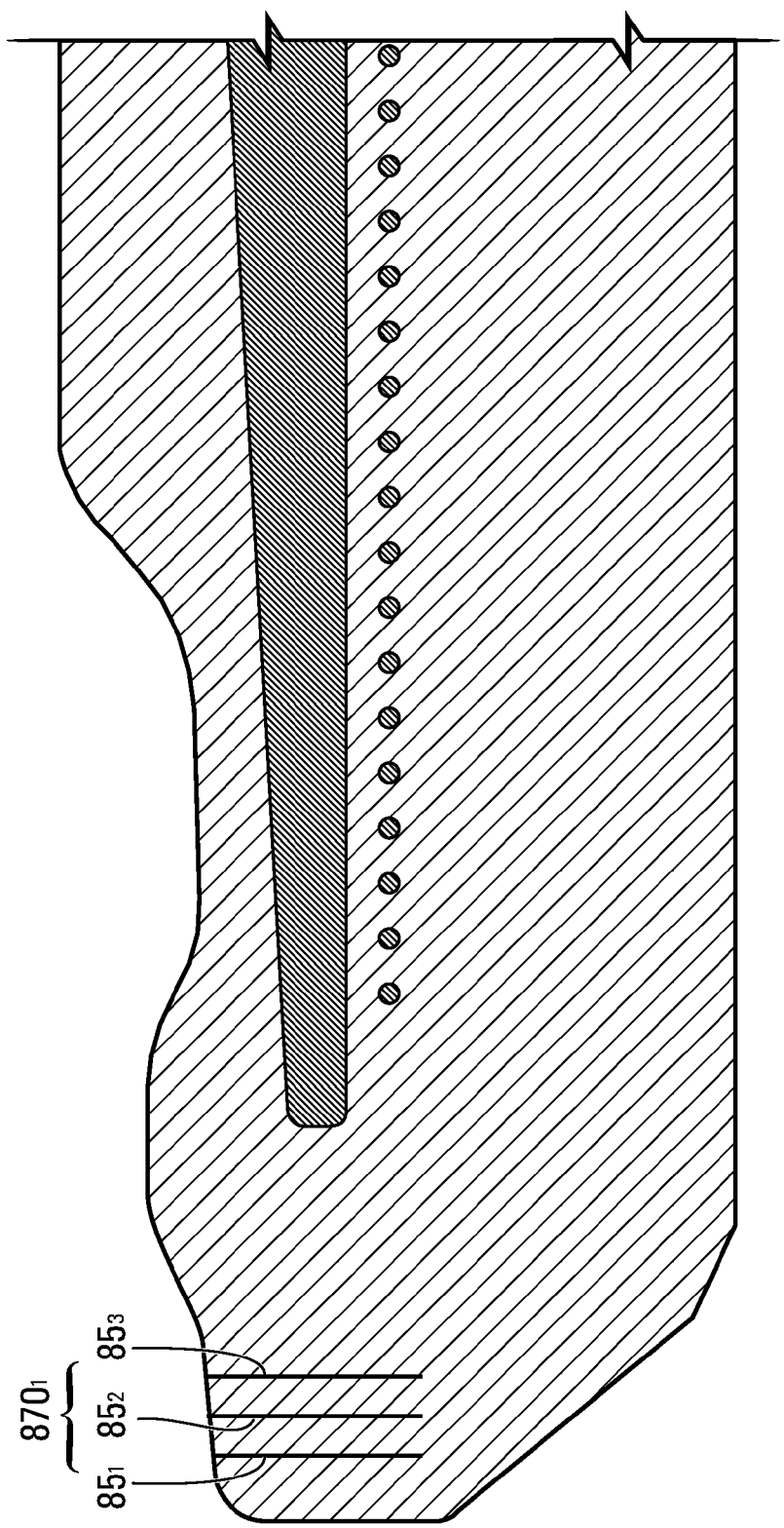
FIG. 28 shows an alternative embodiment in which the lateral edge part comprises a plurality of slits.

For example, in some embodiments, as shown in FIG. 28, the impact absorber 870$_1$ may comprise a plurality of slits 85$_1$-85$_3$ formed during manufacturing of the endless track 22 (e.g., by cutting). In this case, the slits 85$_1$-85$_3$ extend inwardly from the inner side 25 of the track 22. In other cases, the slits 85$_1$-85$_3$ may extend inwardly from the ground-engaging outer side 27 of the track 22 or from the lateral edge 31$_1$ of the track 22. Although in this example the impact absorber 870$_1$ comprises three slits 85$_1$-85$_3$, in other examples, the impact absorber 870$_1$ may comprise any number of slits (e.g., a single slit, two slits, or more than three slits) such as the slits 85$_1$-85$_3$.

Figure 29:
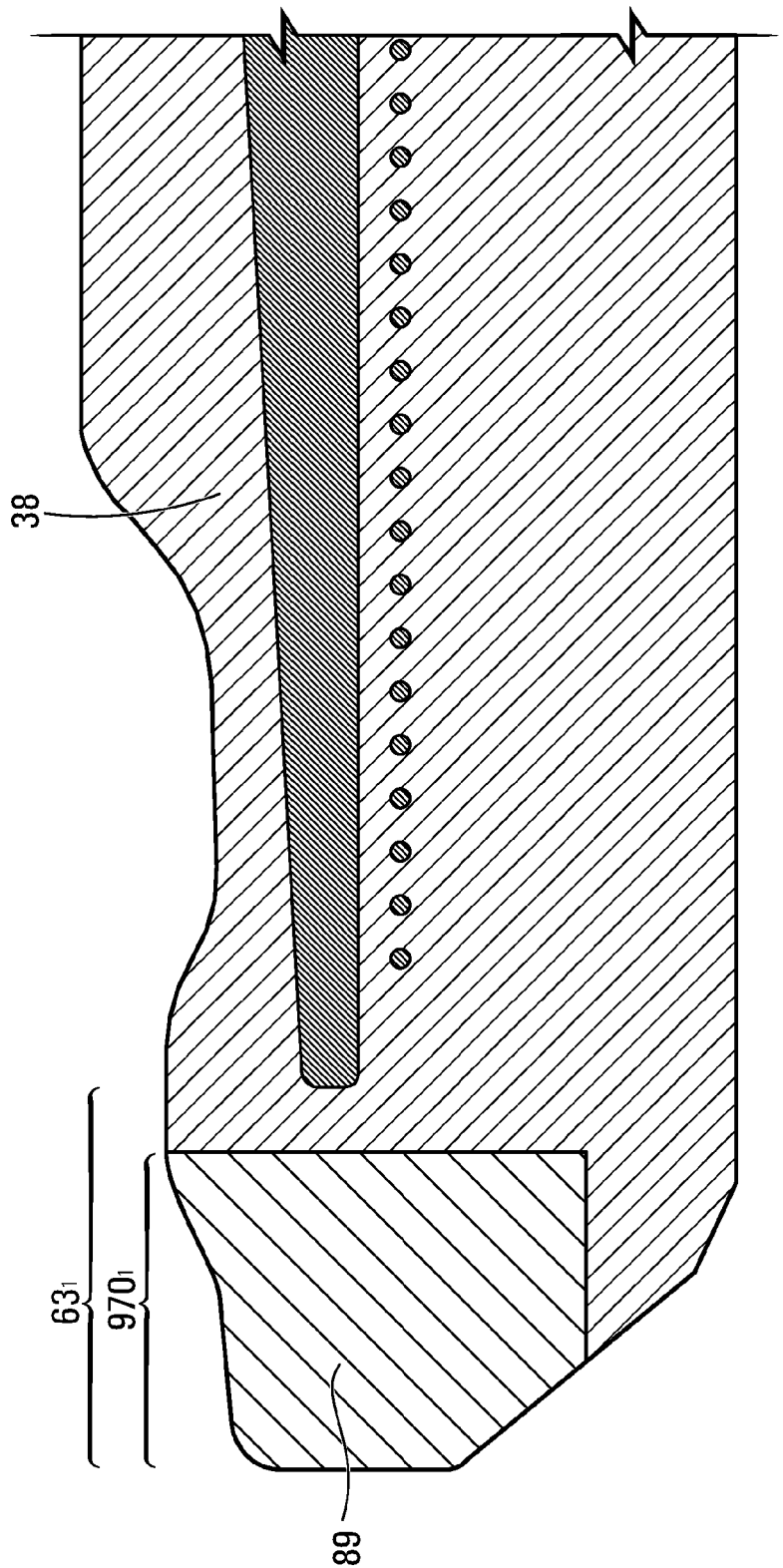
FIG. 29 shows an alternative embodiment in which the lateral edge part comprises an elastic material different from an elastomeric material in which cores of the endless track are at least partially embedded.

As another example, in some embodiments, as shown in FIG. 29, the impact absorber 970$_1$ may comprise an elastic material 89 which is different from the rubber 38 of the central part 62 of the endless track 22 in which the cores 44$_1$-44$_N$ are embedded. The elastic material 89 may include an elastomer (e.g., a foam rubber or another rubber, a polyurethane foam) or some other elastic substance. The elastic material 89 may be provided in the endless track 22 in various ways. For instance, in some cases, the elastic material 89 may be provided by molding it with the rubber 38 of the track 22 during molding of the track 22. In other cases, the elastic material 89 may be provided by affixing it to the rubber 38 of the track 22 using a suitable adhesive.

In some cases, the elastic material 89 may be more elastic (i.e., have a greater elasticity) than the rubber 38 of the central part 62 of the endless track 22. In other words, the elastic material 89 may have a modulus of elasticity lower than a modulus of elasticity of the rubber 38 of the central part 62 of the endless track 22. For instance, in some embodiments, the elastic material 89 may have a modulus of elasticity that is at least 10%, in some cases at least 20%, in some cases at least 30%, in some cases at least 40%, and in some cases at least 50% lower than that of the rubber 38 of the central part 62 of the endless track 22. Thus, in some embodiments, a ratio of the modulus of elasticity of the elastic material 89 to the modulus of elasticity of the rubber 38 of the central part 62 of the endless track 22 may be no more than 0.9, in some cases no more than 0.8, in some cases no more than 0.7, in some cases no more than 0.6, and in some cases no more than 0.5. In embodiments in which the rubber 38 of the central part 62 of the endless track 22 contains different rubber compounds with different moduli of elasticity, the modulus of elasticity of the rubber 38 of the central part 62 of the endless track 22 can be taken as an average of these different moduli of elasticity (e.g., a weighted average of these different moduli of elasticity based on the weight of each rubber compound and the total weight of the rubber 38 of the central part 62 of the endless track 22). Similarly, in embodiments in which the elastic material 89 contains different compounds with different moduli of elasticity, the modulus of elasticity of the elastic material 89 can be taken as an average of these different moduli of elasticity (e.g., a weighted average of these different moduli of elasticity based on the weight of each compound and the total weight of the elastic material 89).

Alternatively or additionally, in some cases, the elastic material 89 may have a hardness (e.g., a durometer or other suitable hardness measure) lower than a hardness of the rubber 38 of the central part 62 of the endless track 22. For instance, in some embodiments, the elastic material 89 may have a hardness (e.g., a durometer) that is at least 10%, in some cases at least 20%, in some cases at least 30%, in some cases at least 40%, and in some cases at least 50% lower than that of the rubber 38 of the central part 62 of the endless track 22. Thus, in some embodiments, a ratio of the hardness of the elastic material 89 to the hardness of the rubber 38 of the central part 62 of the endless track 22 may be no more than 0.9, in some cases no more than 0.8, in some cases no more than 0.7, in some cases no more than 0.6, and in some cases no more than 0.5. In embodiments in which the rubber 38 of the central part 62 of the endless track 22 contains different rubber compounds with different hardness values, the hardness of the rubber 38 of the central part 62 of the endless track 22 can be taken as an average of these different hardness values (e.g., a weighted average of these hardness values based on the weight of each rubber compound and the total weight of the rubber 38 of the central part 62 of the endless track 22). Similarly, in embodiments in which the elastic material 89 contains different compounds with different hardness values, the modulus of elasticity of the elastic material 89 can be taken as an average of these different hardness values (e.g., a weighted average of these different hardness values based on the weight of each compound and the total weight of the elastic material 89).

In this embodiment, the elastic material 89 extends inwardly from the lateral edge 31$_1$ for a certain portion (e.g., about 80%) of the width W$_e$ of the lateral edge part 63$_1$ and from the inner side 25 for a certain portion (e.g., about 75%)

of the thickness $T_e$ of the lateral edge part $63_1$. In other embodiments, the elastic material 89 may extend inwardly from the lateral edge $31_1$ for another portion (e.g., about 40%, 50% or 60%) or all of the width $W_e$ of the lateral edge part $63_1$ and/or from the inner side 25 for another portion (e.g., about 40%, 50% or 60%) or all of the thickness $T_e$ of the lateral edge part $63_1$. The elastic material 89 may be provided in the endless track 22 during molding of the endless track 22, or after molding of the endless track (e.g., by affixing it using a suitable adhesive).

While in this embodiment the endless track 22 comprises the impact absorber $70_1$ in its first lateral edge part $63_1$ and the impact absorber $70_2$ in its second lateral edge part $63_2$, in other embodiments, the endless track 22 may comprise only one of these impact absorber $70_1$, $70_2$, for instance, on a given one of its lateral edge parts $63_1$, $63_2$ that is more susceptible to impact an obstacle on the ground during use (e.g., the lateral edge part furthest away from a center of the vehicle 10).

Although it is configured in a certain way in this embodiment, each track assembly $16_i$ of the construction vehicle 10, including its endless track 22, may be configured in various other ways in other embodiments.

For example, the endless track 22 may interact with the drive wheel 24 in other ways in other embodiments in order to be moved. For instance, in some embodiments, the inner side 25 of the endless track 22 may comprise a plurality of drive lugs that interact with the drive wheel 24 in order to cause the endless track 22 to be driven (i.e., the track assembly $16_i$ may implement a "positive drive" system), or may frictionally engage the drive wheel 24 to cause the endless track 22 to be driven (i.e., the track assembly $16_i$ may implement a "friction drive" system).

Each track assembly $16_i$ may comprise different and/or additional components in other embodiments. For example, in some embodiments, the track assembly $16_i$ may comprise a front drive wheel (e.g., the idler wheel 26 may be replaced by a drive wheel) instead of or in addition to the drive wheel 24. As another example, in some embodiments, the track assembly $16_i$ may comprise more or less roller wheels such as the roller wheels $28_1$-$28_{10}$. As yet another example, rather than have a generally triangular configuration as in this embodiment, in other embodiments, the track assembly $16_i$ may have various other configurations (e.g., a generally linear configuration).

While in embodiments considered above the off-road vehicle 10 is a construction vehicle for performing construction work, in other embodiments, the off-road vehicle 10 may be an agricultural vehicle (e.g., a tractor, a combine harvester, another type of harvester, etc.) for performing agricultural work, a forestry vehicle (e.g., a feller-buncher, a tree chipper, a knuckleboom loader, etc.) for performing forestry work, a military vehicle (e.g., a combat engineering vehicle (CEV), etc.) for performing work in a military application, a transporter vehicle (e.g., a heavy hauler, a flatbed truck, a trailer, a carrier, etc.) for transporting equipment, materials, cargo or other objects, or any other vehicle operable off paved roads. Although operable off paved roads, an off-road vehicle may also be operable on paved roads in some cases. Also, while in embodiments considered above the off-road vehicle 10 is driven by a human operator in the vehicle 10, in other embodiments, the off-road vehicle 10 may be an unmanned ground vehicle (e.g., a tele-operated or autonomous unmanned ground vehicle).

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. An endless track for providing traction to a vehicle, the endless track having:
   an inner side for facing a plurality of wheels of the vehicle; a ground-engaging outer side for engaging the ground; a first lateral edge; and a second lateral edge, the endless track comprising:
   an elastomeric body;
   a plurality of cores at least partially embedded in the elastomeric body, each core extending transversally to a longitudinal direction of the endless track to provide transverse rigidity to the endless track; and
   an impact absorber in a lateral edge part of the endless track, the lateral edge part being located between the cores and a given one of the first lateral edge and the second lateral edge, the impact absorber facilitating an elastic deformation of the lateral edge part when the lateral edge part impacts an obstacle on the ground, the impact absorber comprising at least one hole, each of the at least one hole extending inwardly from the inner side and being deformable to facilitate the elastic deformation of the lateral edge part.

2. The endless track claimed in claim 1, wherein each of the at least one hole is shrinkable to facilitate the elastic deformation of the lateral edge part.

3. The endless track claimed in claim 1, wherein each of the at least one hole is configured to direct the elastic deformation of the lateral edge part.

4. The endless track claimed in claim 1, wherein each of the at least one hole has a dimension measured along a thickness direction of the endless track that is at least 5% of a thickness of the lateral edge part.

5. The endless track claimed in claim 1, wherein each of the at least one hole has a dimension measured along a thickness direction of the endless track that is at least 10% of a thickness of the lateral edge part.

6. The endless track claimed in claim 1, wherein each of the at least one hole has a dimension measured along a widthwise direction of the endless track that is at least 5% of a width of the lateral edge part.

7. The endless track claimed in claim 1, wherein each of the at least one hole has a dimension measured along a widthwise direction of the endless track that is at least 10% of a width of the lateral edge part.

8. The endless track claimed in claim 1, wherein each of the at least one hole is delimited by elastomeric material of the lateral edge part, each of the at least one hole containing a filler different from the elastomeric material of the lateral edge part.

9. The endless track claimed in claim 8, wherein the filler has a modulus of elasticity lower than a modulus of elasticity of the elastomeric material of the lateral edge part.

10. The endless track claimed in claim 9, wherein the filler includes an elastomer.

11. The endless track claimed in claim 8, wherein the filler has a hardness lower than a hardness of the elastomeric material of the lateral edge part.

12. The endless track claimed in claim 8, wherein the filler includes a fluid confined in the endless track.

13. The endless track claimed in claim 1, wherein the at least one hole comprises a plurality of holes distributed along the longitudinal direction of the endless track.

14. The endless track claimed in claim 13, wherein at least two of the holes are spaced apart from one another along a widthwise direction of the endless track.

15. The endless track claimed in claim 13, wherein respective ones of the holes are aligned with corresponding ones of the cores.

16. The endless track claimed in claim 1, wherein the elastomeric body comprises elastomeric material in which the cores are at least partially embedded, the impact absorber comprising elastic material different from the elastomeric material in which the cores are at least partially embedded.

17. The endless track claimed in claim 16, wherein the elastic material of the impact absorber has a modulus of elasticity lower than a modulus of elasticity of the elastomeric material in which the cores are at least partially embedded.

18. The endless track claimed in claim 17, wherein the elastic material comprises an elastomer.

19. The endless track claimed in claim 16, wherein the elastic material of the impact absorber has a hardness lower than a hardness of the elastomeric material in which the cores are at least partially embedded.

20. The endless track claimed in claim 1, wherein the impact absorber is a first impact absorber, the lateral edge part is a first lateral edge part, and the given one of the first lateral edge and the second lateral edge is the first lateral edge, the endless track comprising a second impact absorber in a second lateral edge part of the endless track, the second lateral edge part being located between the cores and the second lateral edge, the second impact absorber facilitating an elastic deformation of the second lateral edge part when the second lateral edge part impacts an obstacle on the ground the second impact absorber comprising at least one hole, each of the at least one hole of the second impact absorber extending inwardly from the inner side and being deformable to facilitate the elastic deformation of the second lateral edge part.

21. The endless track claimed in claim 20, wherein the at least one hole of the first impact absorber comprises a plurality of holes distributed along the longitudinal direction of the endless track and the at least one hole of the second impact absorber comprises a plurality of holes distributed along the longitudinal direction of the endless track.

22. The endless track claimed in claim 1, wherein each core comprises a pair of wings and a wheel guide, the wheel guide comprising at least one projection on the inner side.

23. An endless track for providing traction to a vehicle, the endless track having:
an inner side for facing a plurality of wheels of the vehicle; a ground-engaging outer side for engaging the ground; a first lateral edge; and a second lateral edge, the endless track comprising:
an elastomeric body;
a plurality of cores at least partially embedded in the elastomeric body, each core extending transversally to a longitudinal direction of the endless track to provide transverse rigidity to the endless track; and
a hole in a lateral edge part of the endless track, the lateral edge part being located between the cores and a given one of the first lateral edge and the second lateral edge, the hole extending inwardly from the inner side and being deformable when the lateral edge part impacts an obstacle on the ground.

24. The endless track claimed in claim 23, wherein the hole is shrinkable when the lateral edge part impacts the obstacle on the ground.

25. The endless track claimed in claim 23, wherein the hole is configured to direct an elastic deformation of the lateral edge part when the lateral edge part impacts the obstacle on the ground.

26. The endless track claimed in claim 23, wherein the lateral edge part is a first lateral edge part and the given one of the first lateral edge and the second lateral edge is the first lateral edge, the endless track comprising a hole in a second lateral edge part of the endless track, the second lateral edge part being located between the cores and the second lateral edge, the hole of the second lateral edge part extending inwardly from the inner side and being deformable when the second lateral edge part impacts an obstacle on the ground.

27. The endless track claimed in claim 26, wherein the hole of the first lateral edge part is one of a plurality of holes of the first lateral edge part, the holes of the first lateral edge part being distributed along the longitudinal direction of the endless track, the hole of the second lateral edge part being one of a plurality of holes of the second lateral edge part, the holes of the second lateral edge part being distributed along the longitudinal direction of the endless track.

28. The endless track claimed in claim 23, wherein each core comprises a pair of wings and a wheel guide, the wheel guide comprising at least one projection on the inner side.

29. The endless track claimed in claim 23, wherein the hole has a dimension measured along a thickness direction of the endless track that is at least 5% of a thickness of the lateral edge part.

30. The endless track claimed in claim 23, wherein the hole has a dimension measured along a thickness direction of the endless track that is at least 10% of a thickness of the lateral edge part.

31. The endless track claimed in claim 23, wherein the hole has a dimension measured along a widthwise direction of the endless track that is at least 5% of a width of the lateral edge part.

32. The endless track claimed in claim 23, wherein the hole has a dimension measured along a widthwise direction of the endless track that is at least 10% of a width of the lateral edge part.

33. The endless track claimed in claim 23, wherein the hole is delimited by elastomeric material of the lateral edge part and contains a filler different from the elastomeric material of the lateral edge part.

34. The endless track claimed in claim 33, wherein the filler has a modulus of elasticity lower than a modulus of elasticity of the elastomeric material of the lateral edge part.

35. The endless track claimed in claim 33, wherein the filler includes an elastomer.

36. The endless track claimed in claim 33, wherein the filler has a hardness lower than a hardness of the elastomeric material of the lateral edge part.

37. The endless track claimed in claim 23, wherein the hole is one of a plurality of holes of the lateral edge part that are distributed along the longitudinal direction of the endless track and extend inwardly from the inner side.

38. The endless track claimed in claim 37, wherein at least two of the holes are spaced apart from one another along a widthwise direction of the endless track.

39. The endless track claimed in claim 37, wherein respective ones of the holes are aligned with corresponding ones of the cores.

40. An endless track for providing traction to a vehicle, the endless track having:
an inner side for facing a plurality of wheels of the vehicle; a ground-engaging outer side for engaging the ground; a first lateral edge; and a second lateral edge, the endless track comprising:

an elastomeric body;

a plurality of cores at least partially embedded in the elastomeric body, each core extending transversally to a longitudinal direction of the endless track to provide transverse rigidity to the endless track;

a plurality of holes in a first lateral edge part of the endless track, the first lateral edge part being located between the first lateral edge and the cores, the holes of the first lateral edge part extending inwardly from a periphery of the endless track and being distributed along the longitudinal direction of the endless track; and a plurality of holes in a second lateral edge part of the endless track, the second lateral edge part being located between the second lateral edge and the cores, the holes of the second lateral edge part extending inwardly from the inner side of the endless track and being distributed along the longitudinal direction of the endless track.

41. The endless track claimed in claim 40, wherein each of the holes of the first lateral edge part is shrinkable when the first lateral edge part impacts an obstacle on the ground and each of the holes of the second lateral edge part is shrinkable when the second lateral edge part impacts an obstacle on the ground.

42. The endless track claimed in claim 40, wherein each of the holes of the first lateral edge part has a dimension measured along a thickness direction of the endless track that is at least 5% of a thickness of the first lateral edge part and each of the holes of the second lateral edge part has a dimension measured along the thickness direction of the endless track that is at least 5% of a thickness of the second lateral edge part.

43. The endless track claimed in claim 40, wherein each of the holes of the first lateral edge part has a dimension measured along a thickness direction of the endless track that is at least 10% of a thickness of the first lateral edge part and each of the holes of the second lateral edge part has a dimension measured along the thickness direction of the endless track that is at least 10% of a thickness of the second lateral edge part.

44. The endless track claimed in claim 40, wherein each of the holes of the first lateral edge part has a dimension measured along a widthwise direction of the endless track that is at least 5% of a width of the first lateral edge part and each of the holes of the second lateral edge part has a dimension measured along the widthwise direction of the endless track that is at least 5% of a width of the second lateral edge part.

45. The endless track claimed in claim 40, wherein each of the holes of the first lateral edge part has a dimension measured along a widthwise direction of the endless track that is at least 10% of a width of the first lateral edge part and each of the holes of the second lateral edge part has a dimension measured along the widthwise direction of the endless track that is at least 10% of a width of the second lateral edge part.

46. The endless track claimed in claim 40, wherein each of the holes of the first lateral edge part is delimited by elastomeric material of the first lateral edge part and contains a filler different from the elastomeric material of the first lateral edge part.

47. The endless track claimed in claim 46, wherein the filler has a modulus of elasticity lower than a modulus of elasticity of the elastomeric material of the first lateral edge part.

48. The endless track claimed in claim 46, wherein the filler includes an elastomer.

49. The endless track claimed in claim 46, wherein the filler has a hardness lower than a hardness of the elastomeric material of the first lateral edge part.

50. The endless track claimed in claim 40, wherein respective ones of the holes of the first lateral edge part and respective ones of the holes of the second lateral edge part are aligned with corresponding ones of the cores.

51. The endless track claimed in claim 40, wherein each core comprises a pair of wings and a wheel guide, the wheel guide comprising at least one projection on the inner side.

* * * * *